(12) United States Patent
Hamanaka

(10) Patent No.: US 6,980,667 B2
(45) Date of Patent: Dec. 27, 2005

(54) IMAGE PROCESSING APPARATUS INCLUDING AN IMAGE DATA ENCODER HAVING AT LEAST TWO SCALABILITY MODES AND METHOD THEREFOR

(75) Inventor: Akiyoshi Hamanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/452,226

(22) Filed: Jun. 3, 2003

(65) Prior Publication Data

US 2003/0206659 A1 Nov. 6, 2003

Related U.S. Application Data

(62) Division of application No. 09/389,449, filed on Sep. 3, 1999, now Pat. No. 6,603,883.

(30) Foreign Application Priority Data

Sep. 8, 1998 (JP) .................................. 10-254157
Dec. 25, 1998 (JP) .................................. 10-371649

(51) Int. Cl.[7] ............................................ G06K 9/00
(52) U.S. Cl. ..................................... 382/2.39; 382/233
(58) Field of Search ................................ 382/233, 232, 382/239, 240, 298, 299, 238; 375/240.02, 375/240.21, 240.25, 240.29

(56) References Cited

U.S. PATENT DOCUMENTS

| 5,278,646 | A | * | 1/1994 | Civanlar et al. ........ 375/240.25 |
| 5,432,871 | A | | 7/1995 | Novik ......................... 382/232 |
| 5,530,477 | A | * | 6/1996 | Coelho .................. 375/240.01 |
| 5,867,219 | A | * | 2/1999 | Kohiyama ............... 348/400.1 |
| 6,005,623 | A | | 12/1999 | Takahashi et al. ...... 375/240.16 |
| 6,256,346 | B1 | | 7/2001 | Yamaguchi et al. ... 375/240.18 |
| 6,414,972 | B1 | * | 7/2002 | Hagai et al. ................. 370/532 |
| 6,466,697 | B1 | * | 10/2002 | Boon ......................... 382/233 |

* cited by examiner

Primary Examiner—Yon J. Couso
(74) Attorney, Agent, or Firm—Fitzpatrick, Cella, Harper & Scinto

(57) ABSTRACT

An image processing apparatus and method therefor for presenting an image corresponding to the capability of equipment to which an image is supplied, and the needs of users. The apparatus present the image by inputting external information represents desired scalability from external equipment, encoding the image data with the desired scalability according to the external information, and outputting the encoded data to external equipment.

5 Claims, 22 Drawing Sheets

IMAGE PROCESSING APPARATUS INCLUDING AN IMAGE DATA ENCODER HAVING AT LEAST TWO SCALABILITY MODES AND METHOD THEREFOR

This application is a division of application Ser. No. 09/389,449, filed Sep. 3, 1999, now U.S. Pat. No. 6,603,883.

BACKGROUND OF THE INVENTION

1. Field of the Invention

The present invention relates to an image processing apparatus and method therefor. More specifically, the present invention related to an image processing apparatus for encoding and decoding image data and to a method of encoding and decoding the same.

2. Related Background Art

JPEG (Joint Photographic Coding Experts Group), H.261, and its improved MPEG (Moving Picture Experts Group) exist as international standards for the encoding of sound and image data. To handle integrated sounds and images in the current multi-media age, MPEG has been improved to MPEG1, and MPEG1 has undergone further improvement to MPEG2, both of which are currently in widespread use.

MPEG2 is the standard for moving picture encoding which is developed to respond to the demands for high image quality. Specifically:

(1) it can be used for applications ranging from communications to broadcasting, in addition to stored media data, (2) it can be used for images with much higher quality than standard television, with possibility of extension in High Definition Television (HDTV), (3) unlike MPEG1 and H.261, which can only be used with non-interlaced image date, MPEG2 can be used to encode interlaced images, (4) it possesses scalability, and (5) an MPEG2 decoder is able to process an MPEG1 bit stream; in other words, it is downwardly compatible.

Of the five characteristics listed, especially, item (4), scalability, is new to MPEG2, and roughly classified into three types, spatial scalability, temporal scalability, and signal to noise ratio (SNR) scalability, which are outlined below.

Spatial Scalability

FIG. 1 shows an outline of spatial scalability encoding. The base layer has a small temporal resolution, while the enhancement layer has a large temporal resolution.

The base layer consists of spatial sub-sampling of the original image at a fixed ratio, lowering the spatial resolution (image quality), and reducing the encoding volume per frame. In other words, it is a layer with a lower spatial resolution image quality and less code amount. Encoding takes place by using interframe prediction encoding within the base layer. This means that the image can be decoded from only the base layer.

On the other hand, the enhancement layer has a high image quality for spatial resolution and large code amount. The base layer image data is up-sampled (averaging, for example, is used to add a pixel between pixels in the low resolution image, creating a high resolution image) to generate an expanded base layer with the same size as the enhancement layer. Encoding takes place using not only predictions from an image within the enhancement layer, but also predictions taken from the up-sampled expanded image. Therefore it is not possible to decode the image from only the enhancement layer.

By decoding image data of the enhancement layer, encoded as described above, an image with the same spatial size as the original image is obtained, the image quality depending upon the rate of compression.

The use of spatial scalability allows two image sequences to be efficiently encoded, as compared to encoding and sending each image separately.

Temporal Scalability

FIG. 2 shows an outline of temporal scalability encoding. The base layer has a small temporal resolution, while the enhancement layer has a large temporal resolution.

The base layer has a temporal resolution (frame rate) that has been provided by thinning out the original image on a frame basis at a constant rate, thereby lowering the temporal resolution and reducing the amount of encoded data to be transmitted. In other words, it is a layer with a lower image quality for temporal resolution and less code amount. Encoding takes place using inter-frame prediction encoding within the base layer. This means that the image can be decoded from only the base layer.

On the other hand, the enhancement layer has a high image quality for temporal resolution and large code amount. Encoding takes place using prediction from not only I, P, B pictures within the enhancement layer, but also the base layer image data. Therefore it is not possible to decode the image from only the enhancement layer.

By decoding image data of the enhancement layer, encoded as described above, an image with the same frame rate as the original image is obtained, the image quality depending upon the rate of compression.

Temporal scaling allows, for example, a 30 Hz non-interlaced image and a 60 Hz non-interlaced image to be sent efficiently at the same time.

Temporal scalability is currently not in use. It is part of a future expansion of MPEG2 (treated as "reserved").

SNR Scalability

FIG. 3 shows an outline of SNR scalability encoding.

The layer having a low image quality is referred to as a base layer, whereas the layer having a high image quality is referred to as an enhancement layer.

The base layer is provided, in the process of encoding (compressing) the original data, for example, in dividing it into blocks, DC-AC converting, quantizing and variable length encoding, by compressing the original image at relatively high compression rate (rough quantum step size) to result in less code amount. That is, the base layer is a layer with a low image quality, in terms of (N/S) image quality, and less code amount. In this base layer, encoding is carried out using MPEG1 or MPEG2 (with predictive encoding) decided to each frame.

On the other hand, the enhancement layer has a higher quality larger code amount than the base layer. The enhancement layer is provided by decoding an encoded image in the base layer, subtracting the decoded image from the original image, and intraframe encoding only the subtraction result at a relatively low compression rate (with a quantizing step size smaller than in the base layer). All encoding in SNR scaling takes place within the frame (field). No inter-frame (inter-field) prediction encoding is used. The entire encoding sequence is performed intra-frame (intra-field).

Using SNR scalability allows two types of images with differing picture quality to be encoded or decoded efficiently at the same time.

However, previous designs of encoding devices is not provided an option to freely select the size of the base layer image in spatial scalability. The image size of the base layer is a function of relationship between the enhancement layer and the base layer, and hence is not allowed to vary.

In addition, SNR scalability devices have faced similar limitations. The base layer frame rate is determined uniquely as a function of the enhancement layer, and the size of the base layer image could not be freely selected.

Therefore, previous encoding devices have not allowed one to select code amount, such as an image size and a frame rate, when using the scalability function. One could not select any factor directly related to the condition of the decoding device or the lines on the output side.

In other words, when an encoded image data is output from an encoding device employing spatial scalability or SNR scalability to a decoding device (receiving side), image quality choices are limited to:

1) a low quality image decoded from the base layer only, or 2) a high quality image provided by decoding both the base layer and the enhancement layer.

Accordingly, there is no opportunity to select image quality (decoding speed) in accordance with the capabilities of the decoding device or the needs of an individual user, which is a problem not addressed previously.

In addition, recent advances have taken place in the imaging field related to object encoding. MPEG4, currently being advanced as the imaging technology standard, is a good example. MPEG4 splits up one image into a background and several objects which exist in front of that background, and then encodes each of the different parts independently. Object encoding enjoys many benefits.

If the background is a relatively static environment and only some of the objects in the foreground are undergoing motion, then the background and all objects that do not move do not need to be re-encoded. Only the object which is moving is re-encoded. The amount of codes generated by re-encoding, that is, the amount of codes generated in encoding of the next image frame, is greatly reduced, and transmission of a very high quality image at a low transfer rate can be attained.

In addition, computer graphics (CG) can be used to provide an object image. In this case, the encoder only needs to encode the CG mesh (position and shape change) data, further contributing to the slimming down of the transfer code amount.

On the decoder side, the mesh data can be used to construct the image through computation to incorporate the constructed image into a picture. Using face animation as an example of CG, the eyes, nose, and other object data and their shape change information, received from the encoder, can be used by the decoder to perform operation on the characteristic data in the decoder, and then the updating operation to include the new data into the image can be carried out, thereby forming the animation.

Until now, when decoding an encoded image data at an image display terminal, the hierarchical degree at which a decoding process would take place has been fixed. For that reason, there has no selectability or possibility to change the hierarchy of the object to be displayed. Accordingly, this has not led to a high performance processing that meets with the processing capabilities of the terminal. Optimal decoding that makes use of the capabilities of the decoder, in relation to the encoded image data changing with time from the encoder, has not been possible.

In addition, encoding and decoding of CG data has been generally considered a process that is best handled in software, not hardware, and there are many examples of such software processes. Therefore, if the number of objects within one frame of an image increases, the hardware load on the decoder rapidly increases, but if the objects are face animation or similar CG data, then the software load (operation volume, operation time) will grow large.

A face object visual standard is defined for the encoding of face images in CG. In MPEG4, a face definition parameter (FDP), defining shape and texture of the facial image, and a face animation parameter (FAP), used to express the motions of the face, eyebrows, eyelids, eyes, nose, lips, teeth, tongue, cheeks, chin, etc., are used as standards.

A face animation is made by processing the FDP and FAP data and combining the results, thereby creating a larger load for the decoder than decoding by using encoded natural image data. The performance of the decoder may lead to obstacles such as the inability to decode, which can in turn lead to image quality problems such as object freeze and incompleteness.

SUMMARY OF THE INVENTION

In view of the background described above, an object of the present invention is to provide an image processing apparatus, and a method used therein, through which image data that satisfies the needs of users and responds to the performance characteristics of external equipment receiving the image data, may be obtained.

According to a preferred embodiment of the present invention, there is provided an image processing apparatus and method therefor wherein external information representing a desired scalability is input from external equipment, then image data is encoded at the desired scalability according to the external information, and the encoded data is output to the external equipment.

According to another preferred embodiment of the present invention, there is provided an image processing apparatus and method therefor wherein image data encoded at a predetermined scalability by external equipment is input, the encoded image data is decoded, and in order to make the external equipment encode image data at the desired scalability, information representing the desired scalability is output to the external equipment.

According to another preferred embodiment of the present invention, there is provided an image processing apparatus and method therefor, for receiving encoded image data and decoding the encoded image data, wherein a decoding process is controlled according to the encoded image data and decoding processing capabilities.

Other objects, features, and advantages of the invention will become apparent from the following detailed descriptions taken in conjunction with the accompanying drawings.

DETAILED DESCRIPTION OF THE PREFERRED EMBODIMENTS

Figure 1:
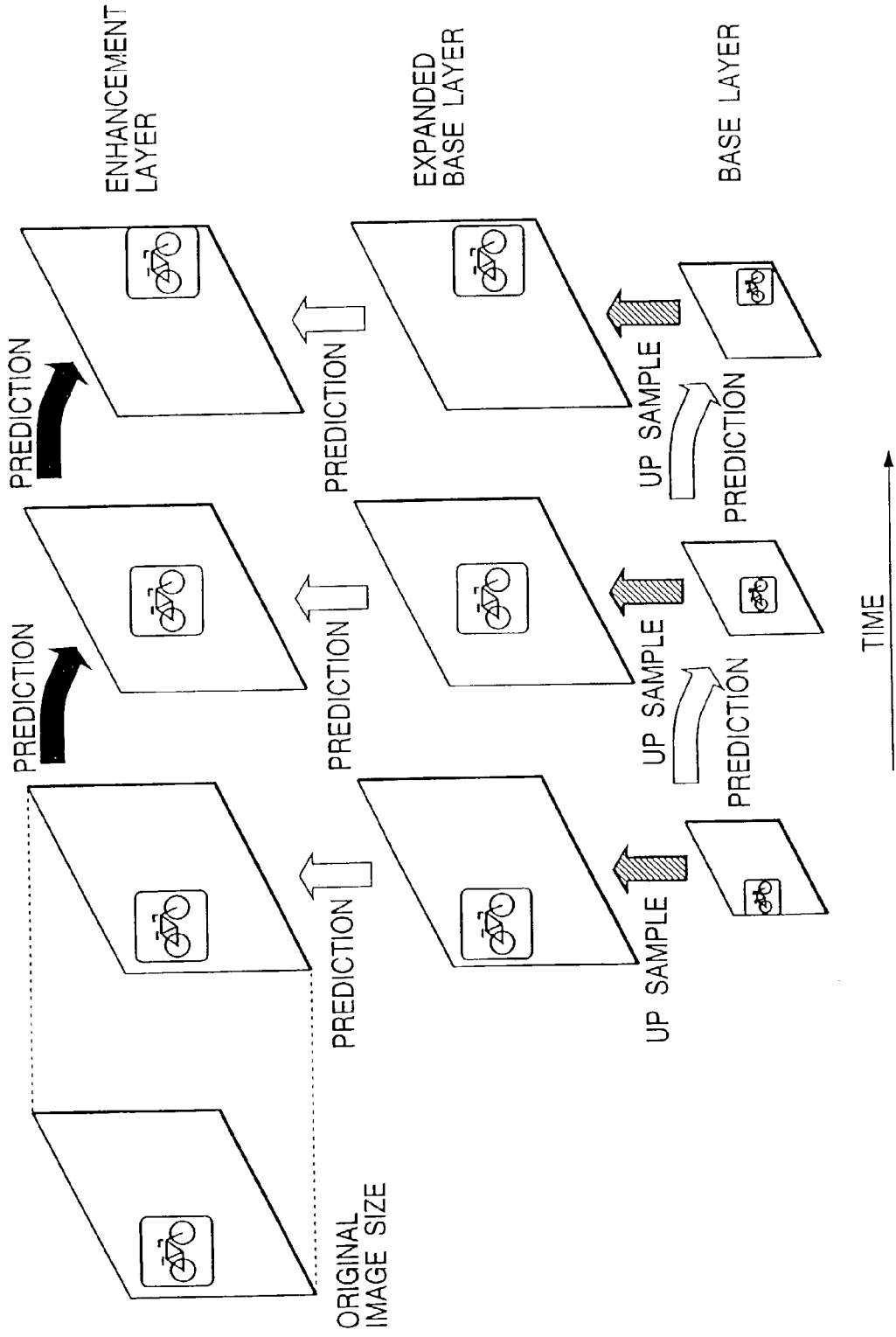
FIG. 1 is a view for illustrating spatial scalability.
Figure 2:
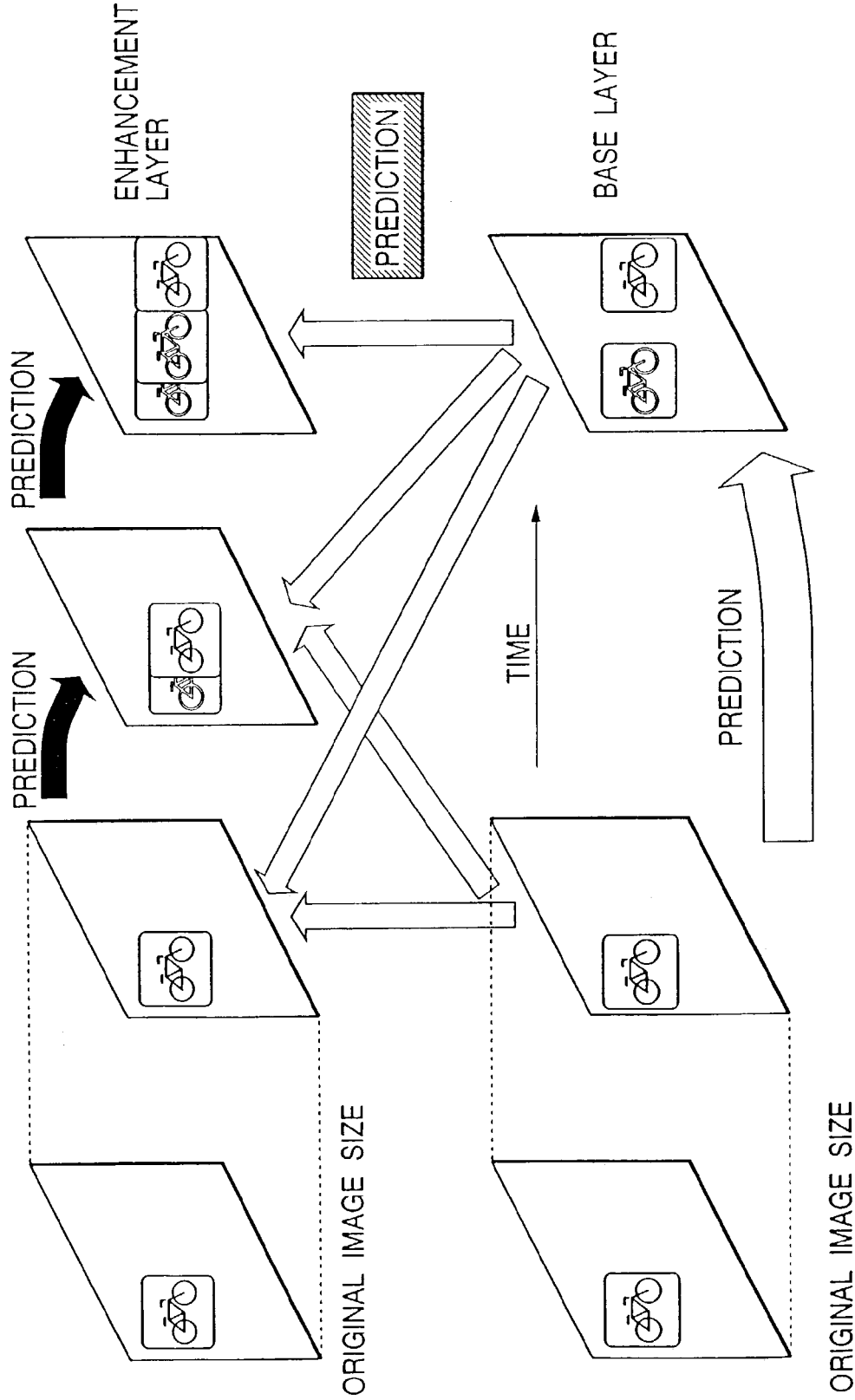
FIG. 2 is a view for illustrating temporal scalability.
Figure 3:
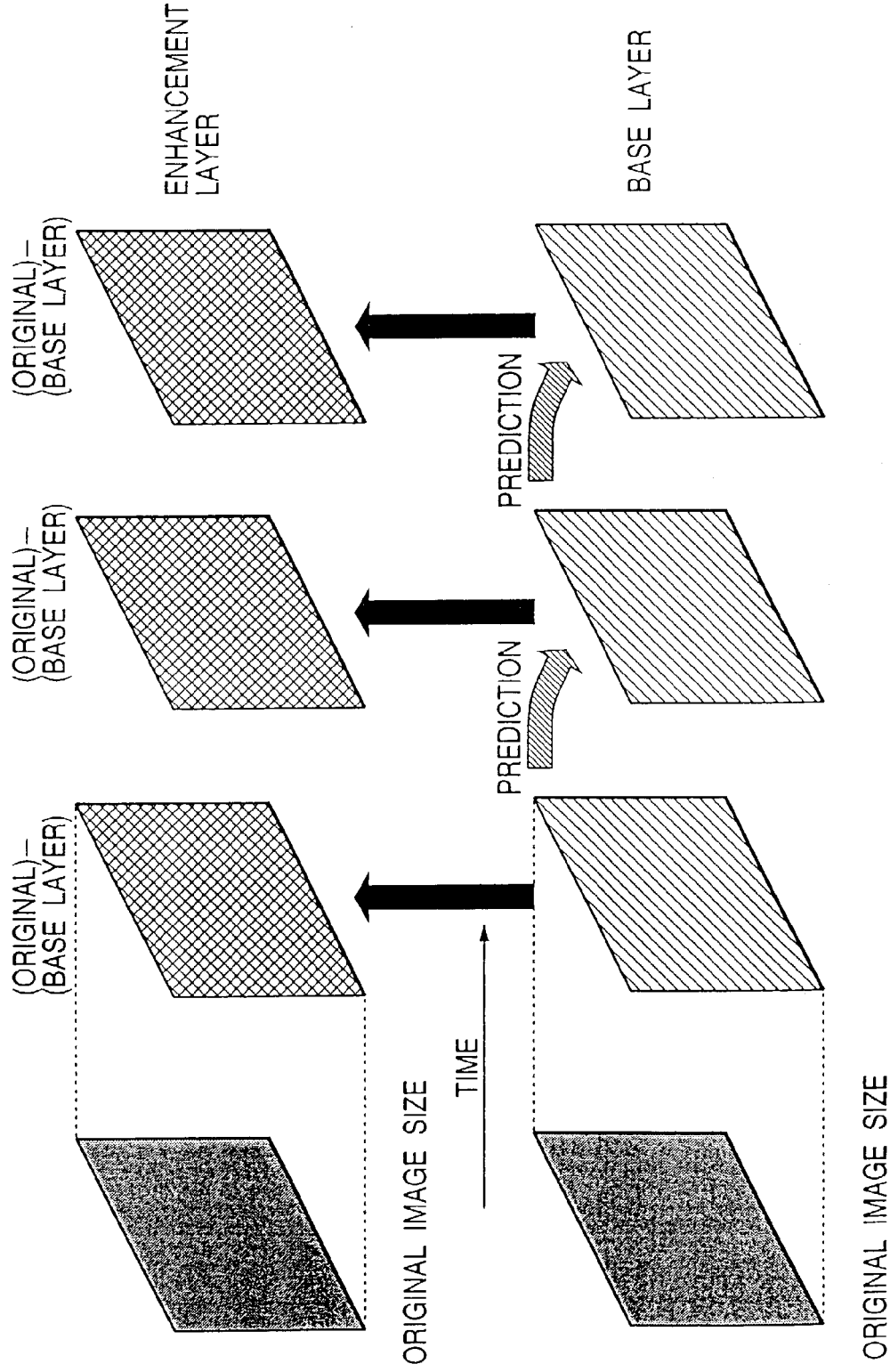
FIG. 3 is a view for illustrating SNR scalability.
Figure 4:
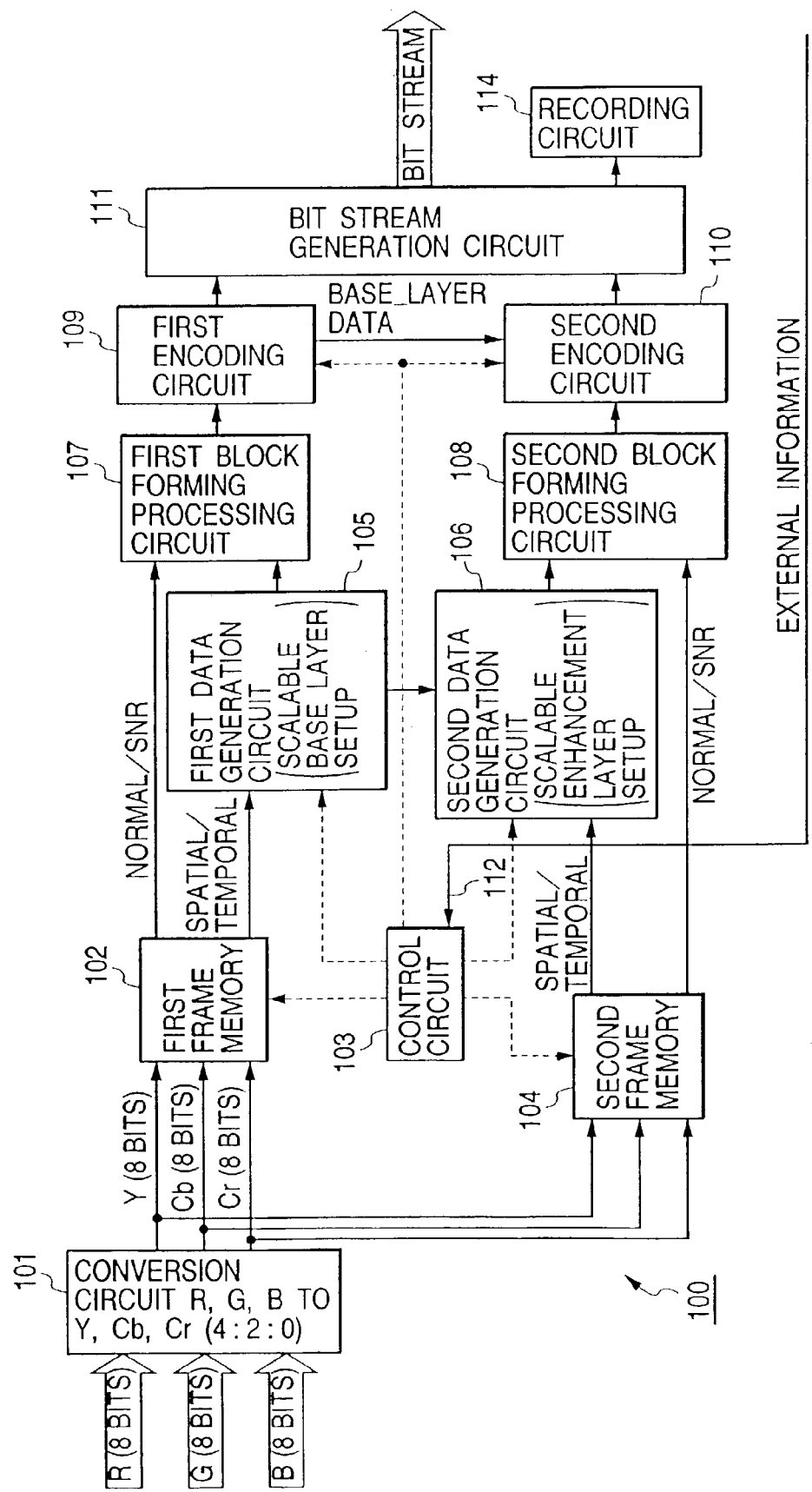
FIG. 4 is a block diagram showing the structure of an encoding device in a first embodiment of the present invention.

A first embodiment of the present invention is an encoding device 100 shown in FIG. 4.

The encoding device 100 is comprised of a conversion circuit 101 that is supplied with R.G.B. data each having 8 bits, and a first frame memory 102 that is supplied with the output of the conversion circuit 101. In addition, it is comprised of a first data generation circuit 105 and a first block forming processing circuit 107 which are both supplied by the output of the first frame memory 102, and a first encoding circuit 109 that is supplied with the output of the first block forming processing circuit 107. The first block forming processing circuit 107 is also supplied with the output of the first data generation circuit 105.

In addition, the encoding device 100 is further comprised of a second frame memory 104 that is supplied with the output of the conversion circuit 101, and a second data generation circuit 106 and a second block forming processing circuit 108, which are both supplied by the output of the second frame memory 104. It is also comprised of a second encoding circuit 110 that is supplied with the output of the second block forming processing circuit 108. The second block forming processing circuit 108 is also supplied with the output of the second data generation circuit 106.

The output from the first data generation circuit 105 is also provided to the second data generation circuit 106, while the output from the first encoding circuit 109 is similarly provided to the second encoding circuit 110.

The encoding device 100 is further comprised of a bit stream generation circuit 111, which is supplied with the outputs of the first encoding circuit 109 and the second encoding circuit 110, a recording circuit 114 that records the data output by the bit stream generation circuit 111 onto a storage medium (for example, a hard disk, video tape, etc.), and a control circuit 103, which controls the entire apparatus.

Figure 5:
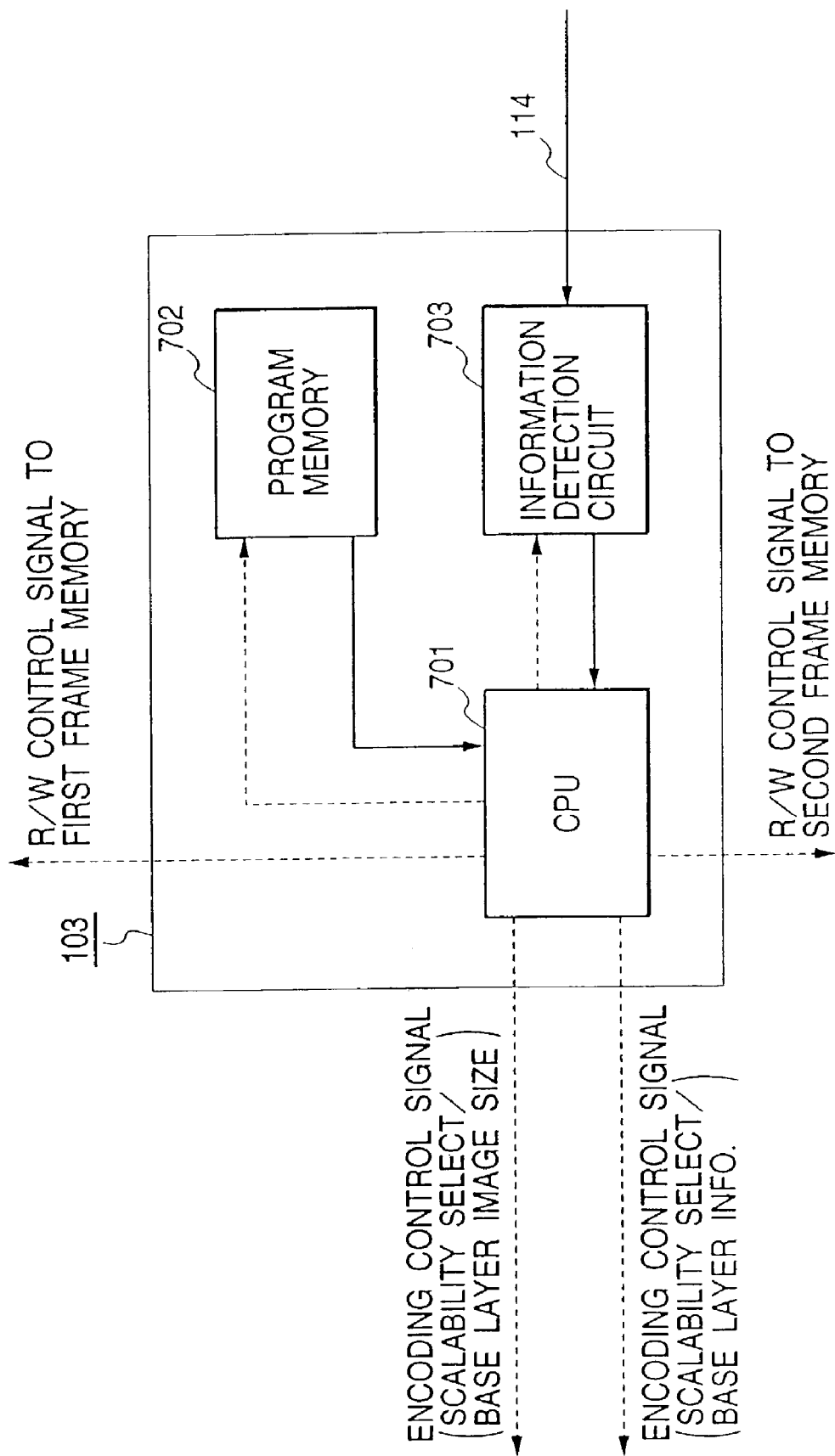
FIG. 5 is a block diagram showing the internal structure of a control circuit 103.

The internal structure of the control circuit 103 is shown in FIG. 5, and consists of a CPU 701, a program memory 702 that stores process programs necessary to control the entire apparatus and readable by CPU 701, and an information detection circuit 703 that is supplied with an external information 112 described in detail later. The external information 112 (external information), which consists of infrastructure information, user requests and other data from outside the encoding device, is also supplied to the CPU 701.

Accordingly, the CPU 701 reads out the programs that control processes, from program memory 702 and executes the read-out program, thereby realizing the operation of the encoding device 100.

Figure 6:
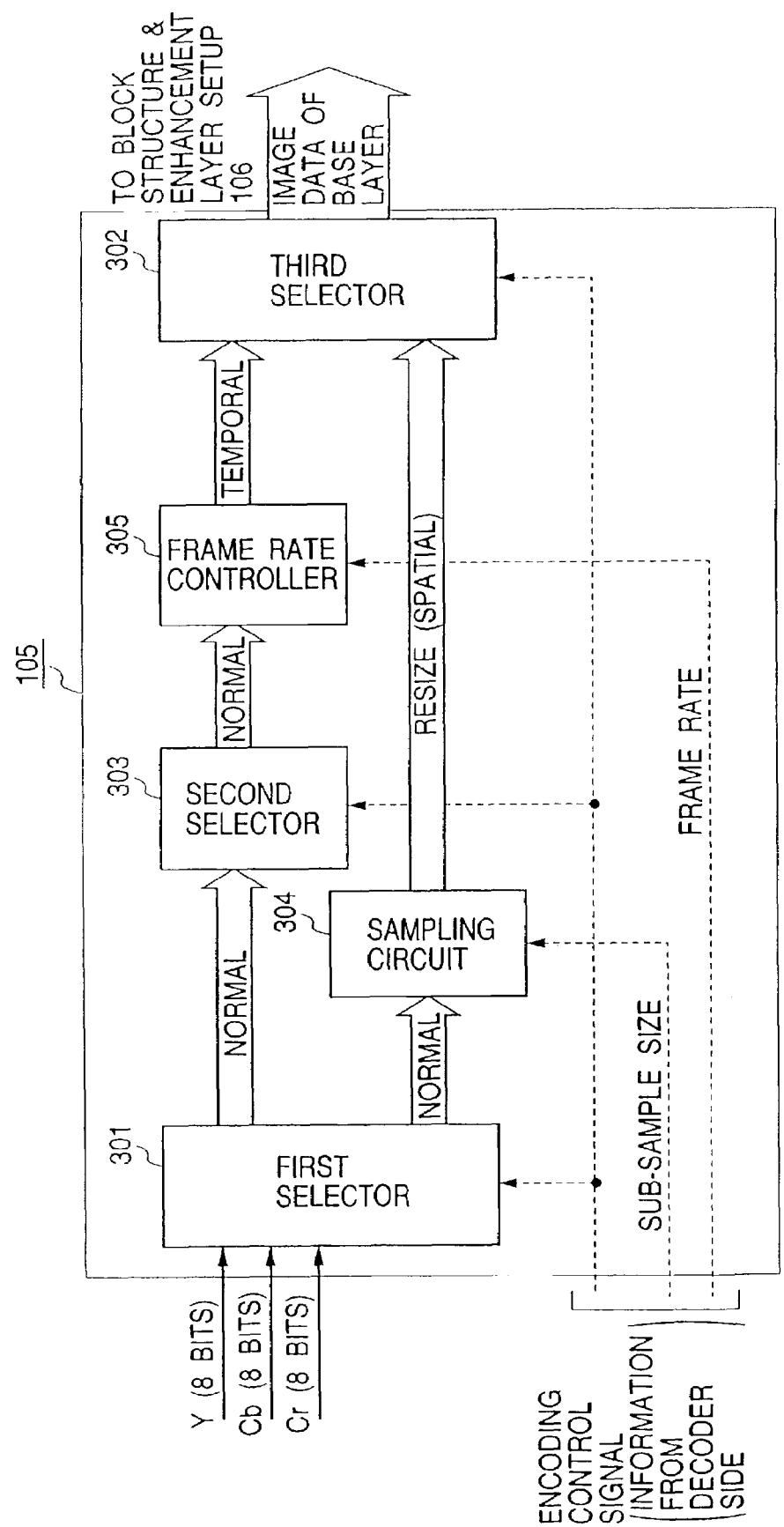
FIG. 6 is a block diagram showing the internal structure of a first data generation circuit 105.

FIG. 6 shows the internal structure of first data generation circuit 105. The first data generation circuit 105 comprises a first selector 301 supplied with the output of the first frame memory 102 (YCbCr data), and a second selector 303 and a sampling circuit 304, both supplied with the output of the first selector 301. In addition, the first data generation circuit 105 further includes a frame rate controller 305 supplied with the output of the second selector 303, and a third selector 302 which is supplied with both outputs of the frame rate controller 305 and the sampling circuit 304. In addition, the third selector 302's output is provided to the first block forming processing circuit 107 and the second data generation circuit 106.

Figure 7:
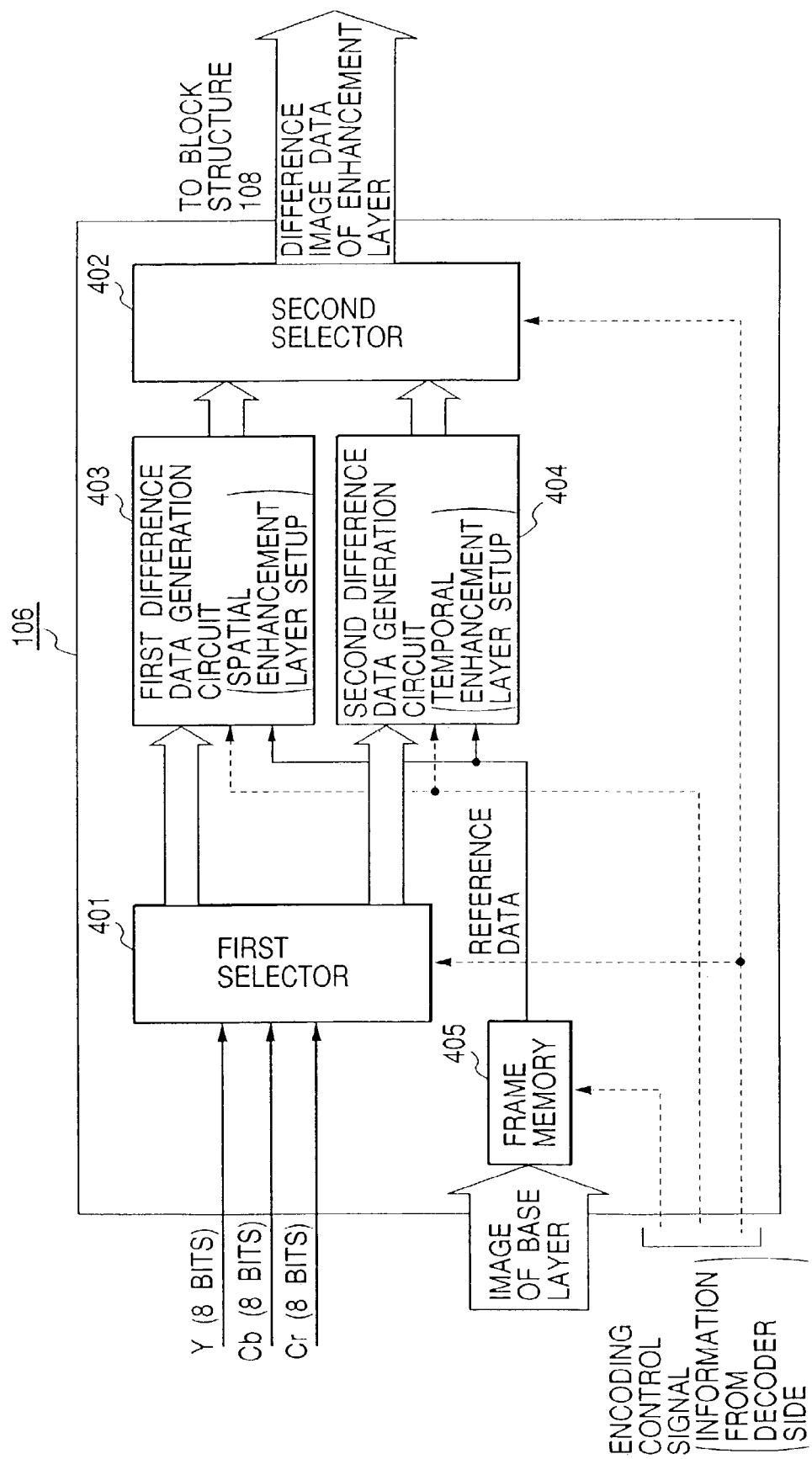
FIG. 7 is a block diagram showing the internal structure of a second data generation circuit 106.

As shown in FIG. 7, the second data generation circuit 106 has an internal structure consisting of a first selector 401 supplied with the output from the second frame memory 104 (YCbCr data), and a frame memory 405 supplied with the output from the first data generation circuit 105 (base layer image data). In addition, the second data generation circuit 106 further includes a first difference data generation circuit 403 and a second difference data generation circuit 404, both supplied with the outputs from the first selector 401 and the frame memory 405, and a second selector 402 supplied with the outputs of the first difference data generation circuit 403 and the second difference data generation circuit 404.

Additionally, the output from the second selector 402 is supplied to the second block forming processing circuit 108.

In the encoding device 100 as described above, the input image data (8 bit RGB data) is first converted to 4:2:0 YCbCr data (each having 8 bits) by the conversion circuit 101, and this converted data is sent to the first frame memory 102 and the second frame memory 104.

Each of the first frame memory 102 and second frame memory 104 stores the converted YCbCr data output by the conversion circuit 101, and the operation control of the storing is performed by the control circuit 103, which operates as follows.

That is, the information detection circuit 703 inside the control circuit 103 (refer to FIG. 5) interprets the external information 112, and provides control information corresponding thereto to the CPU 701.

The CPU 701 then uses the control information provided by the information detection circuit 703 to obtain information such as mode information regarding use and non-use of the scalability function in encoding, information as to type of scalability function to be used, and various control information related to the base layer and the enhancement layer (for example, base layer image size, frame rate, compression ratio, etc.). All of the obtained information (referred to as an encoding control signal hereinafter) is sent to both the first data generation circuit 105 and the second data generation circuit 106 from the CPU 701.

Simultaneously, the CPU 701 provides the first frame memory 102 and the second frame memory 104 with Read/Write (R/W) control signals. This allows reading and writing operations in the first frame memory 102 and the second frame memory 104 to link with the functions of both first data generation circuit 105 and second data generation circuit 106.

Therefore the first frame memory 102 and the second frame memory 104 operate according to R/W control signals based upon the external information 112. The first data generation circuit 105 and the second data generation circuit 106 operate similarly, using an encoding control signal also based upon the external information 112.

An explanation of the operation of downstream circuits from the conversion circuit 101 is detailed below, based upon what is determined by the external information 112, especially, the operational mode. In the explanation, the operation of each circuit is described in relation to each of: spatial scalability mode, temporal scalability mode, SNR scalability mode, and non-scalability mode.

Spatial Scalability Mode

The first frame memory 102 and the second frame memory 104, respectively, perform read/write operations on the YCbCr data from the conversion circuit 101, in accordance with the R/W control signal (the control signal based on external information 112 and specifying spatial scalability mode) provided by the control circuit 103 (specifically, CPU 701).

The YCbCr data read out from the first frame memory 102 and the second frame memory 104 are passed through the first data generation circuit 105 and the second data generation circuit 106 and then provided to the first block forming processing circuit 107 and the second block forming processing circuit 108.

At this time, the first data generation circuit 105 and the second data generation circuit 106 are both supplied with encoding control signals (control signals based upon the external information 112 and specifying spatial scalability mode). Both first data generation circuit 105 and second data generation circuit 106 perform their operations in accordance with those control signals.

In the first data generation circuit 105 (refer to FIG. 6), the first selector 301 switches its output to the sampling circuit 304 according to the encoding control signal received from the control circuit 103, and then the YCbCr data is output from the first frame memory 102.

The sampling circuit 304 generates the base layer image data by compressing the YCbCr image data-received from the first selector 301, in accordance with the sub-sampling size information included in the encoding control signal from the control circuit 103. The base layer image data generated by the sampling circuit 304 is then supplied to the third selector 302.

The third selector 302 then switches its output to the output (the base layer image data) of the sampling circuit 304, according to the encoding control signal from the control circuit 103. Therefore, the base layer image data is then supplied to the first block forming processing circuit 107. The base layer image data is also supplied to the second data generation circuit 106, explained later.

The base layer image data, supplied to the first block forming processing circuit 107 from the first data generation circuit 105, is divided into blocks by block forming processing circuit 107. Then the predetermined encoding processing is performed on the base image data in block unit basis by the first encoding circuit 109, and the encoded data is supplied to the bit stream generation circuit 111.

In the second data generation circuit 106 (refer to FIG. 7), the first selector 401 switches its output over to the first difference data generation circuit 403, in accordance with the encoding control signal from the control circuit 103, to output the YCbCr data received from the second frame memory 104.

At the same time, frame memory 405 supplies the base layer image data from the first data generation circuit 105 to the first difference data generation circuit 403, in accordance with the encoding control signal from the control circuit 103.

The first difference data generation circuit 403 and up-samples the base layer image data from the frame memory 405 in frame or field basis according to the encoding control signal from the control circuit 103, to get the same size as the original image (or an image of the enhancement layer), thereby generating the image difference data between the image data of the enhancement layer and the up-sampled image data.

The image difference data generated by the first difference data generation circuit 403 is then supplied to the second selector 402.

The second selector 402 switches its output to the output (the image difference data) of the first difference data generation circuit 403 according to the encoding control signal from the control circuit 103. Thus the image difference data is supplied to the second block forming processing circuit 108.

The image difference data of the enhancement layer, which is supplied in this way to the second block forming processing circuit 108 from the second data generation circuit 106, is divided into blocks by the second block forming processing circuit 108. The divided data, independent of the base layer image data, then undergoes predetermined encoding processing in block units by the second encoding circuit 110. This result is then supplied to the bit stream generation circuit 111.

The bit stream generation circuit 111 then attaches a suitable header corresponding to a predetermined application (transmit, store), to the base layer image data supplied by the first encoding circuit 109 and the enhancement layer image data (image difference data) supplied by the second encoding circuit 110 to be combined into one bit stream to form a bit stream of scalable image data, and outputs the formed bit stream externally.

Temporal Scalability Mode

In temporal scaling initially, in a way similar to spatial scalability mode described above, the YCbCr data read out from the first frame memory 102 and the second frame memory 104 is also passed the through first data generation circuit 105 and the second data generation circuit 106, and then provided to the first block forming processing circuit 107 and the second block forming processing circuit 108. However, the operation of the first data generation circuit 105 and the second data generation circuit 106 is different than that in operating in the spatial scalability mode described above.

That is, in the first data generation circuit 105 (refer to FIG. 6), the first selector 301 switches its output to the second selector 303, according to the encoding control signal from the control circuit 103 (a control signal specifying the temporal scalability mode based on the external information 112), to output the YCbCr data from the first frame memory 102.

The second selector 303 then supplies the YCbCr data, received from the first selector 301, to the frame rate controller 305, in accordance with the encoding control signal from control circuit 103.

The frame rate controller 305 generates the base layer image data by performing on frame basis a down-sampling (reducing image data resolution in the time basis) on the YCbCr data from the second selector 303, in accordance with the frame rate information contained in the encoding control signal from control circuit 103.

The base layer image data generated by the frame rate controller 305 is then supplied to the third selector 302.

The third selector 302 then switches over its output to the output (the base layer image data) of the frame rate controller 305, according to the encoding control signal from the control circuit 103. Therefore the base layer image data is then supplied to the first block forming processing circuit 107. The base layer image data is also supplied to the second data generation circuit 106, explained later.

The base layer image data, supplied in this way to the first block forming processing circuit 107 from the first data generation circuit 105, is divided into blocks by the block forming processing circuit 107. Then the predetermined encoding processing is performed on the divided data in block units by the first encoding circuit 109, and the encoded data is supplied to the bit stream generation circuit 111.

In the second data generation circuit 106 (refer to FIG. 7), the first selector 401 switches over its output to the second difference data generation circuit 404, according to the encoding control signal from the control circuit 103, and then outputs the YCbCr data received from the second frame memory 104.

At the same time, the frame memory 405 supplies the base layer image data from the first data generation circuit 105 to the second difference data generation circuit 404, in accordance with the encoding control signal from control circuit 103.

The second difference data generation circuit 404 generates the image difference data as the encoded enhancement layer by referring to the base layer image data from the frame memory 405, in accordance with the encoding control signal from the control circuit 103, as prediction information of the enhancement layer, as to image data backward and forward in the time basis.

The image difference data generated by the second difference data generation circuit 404 is then supplied to the second selector 402.

The second selector 402 switches its output to the output (the image difference data) of the second difference data generation circuit 404, in accordance with the encoding control signal from the control circuit 103. Thus the image difference data is supplied to the second block forming processing circuit 108.

The enhancement layer image difference data, which is thus supplied to the second block forming processing circuit 108 from the second data generation circuit 106, is divided into blocks by the second block forming processing circuit 108. The divided data, independent of the base layer image data, then undergoes the encoding processing in block units by the second encoding circuit 110. This result is then supplied to the bit stream generation circuit 111.

The bit stream generation circuit 111, as in the spatial scalability mode described above, then attaches a suitable header to the base layer image data supplied by the first encoding circuit 109 and the enhancement layer image data (image difference data) supplied by the second encoding circuit 110, to form a bit stream of a scalable image data and output the formed-bit stream externally.

SNR Scalability Mode

The first frame memory 102 and the second frame memory 104, respectively, perform read/write operations of the YCbCr data from conversion circuit 101, in accordance with the R/W control signals (the control signals specifying SNR scalability mode based on external information 112) provided by the control circuit 103 (specifically, CPU 701).

In this case, the YCbCr data read out from the first frame memory 102 and the second frame memory 104 is supplied directly to the first block forming processing circuit 107 and the second block forming processing circuit 108.

Next the YCbCr data is divided into blocks by the first block forming processing circuit 107 and the second block forming processing circuit 108, then supplied to the first encoding circuit 109 and the second encoding circuit 110.

In accordance with the encoding control signal from control circuit 103, the first encoding circuit 109 generates encoded base layer image data by performing the predetermined encoding processing, in block units, on the YCbCr data supplied by the first block forming processing circuit 107. The encoding processing is performed so as to attain predetermined code amount (compression ratio) based on the encoding control signal.

The encoded base layer image data from the first encoding circuit 109 is supplied to the bit stream generator 111 and also supplied to the second encoding circuit 110 as a reference in an encoding processing of the enhancement layer image data.

The second encoding circuit 110 generates the image difference data as the encoded enhancement layer by referring to the base layer image data from first encoding circuit 109, in accordance with the encoding control signal from control circuit 103, as prediction information of the enhancement layer as to both past and future image data.

The encoded enhancement layer (image difference data) obtained by the second encoding circuit 110 is then supplied to the bit stream generation circuit 111.

In a manner similar to spatial scalability and temporal scalability, described above, the bit stream generation circuit 111 attaches a header to the base layer image data from the first encoding circuit 109 and the enhancement layer image data (image difference data) from the second encoding circuit 110, to generate a bit stream of scalable image data and output the generated bit stream externally.

Non-Scalability Mode

The first frame memory 102 and the second frame memory 104, respectively, perform read/write-operations of the YCbCr data from the conversion circuit 101, in accordance with the R/W control signals (the control signals specifying non-scalability mode based on external information 112) provided by the control circuit 103 (specifically, CPU 701).

In this case, the YCbCr data read out from the first frame memory 102 and the second frame memory 104 is supplied directly to the first block forming processing circuit 107 and the second block forming processing circuit 108.

The YCbCr data is then divided into blocks by the first block forming processing circuit 107 and the second block forming processing circuit 108, and undergoes the predetermined encoding processing in block units in the first encoding circuit 109 and the second encoding circuit 110. The encoded data is then supplied to the bit stream generation circuit 111.

The bit stream generation circuit 111 then attaches a suitable header corresponding to a predetermined application (transmit, store) to the respective data supplied by both the first encoding circuit 109 and the second encoding circuit 110, to form a bit stream of the image data and output the formed bit stream externally.

Figure 8:
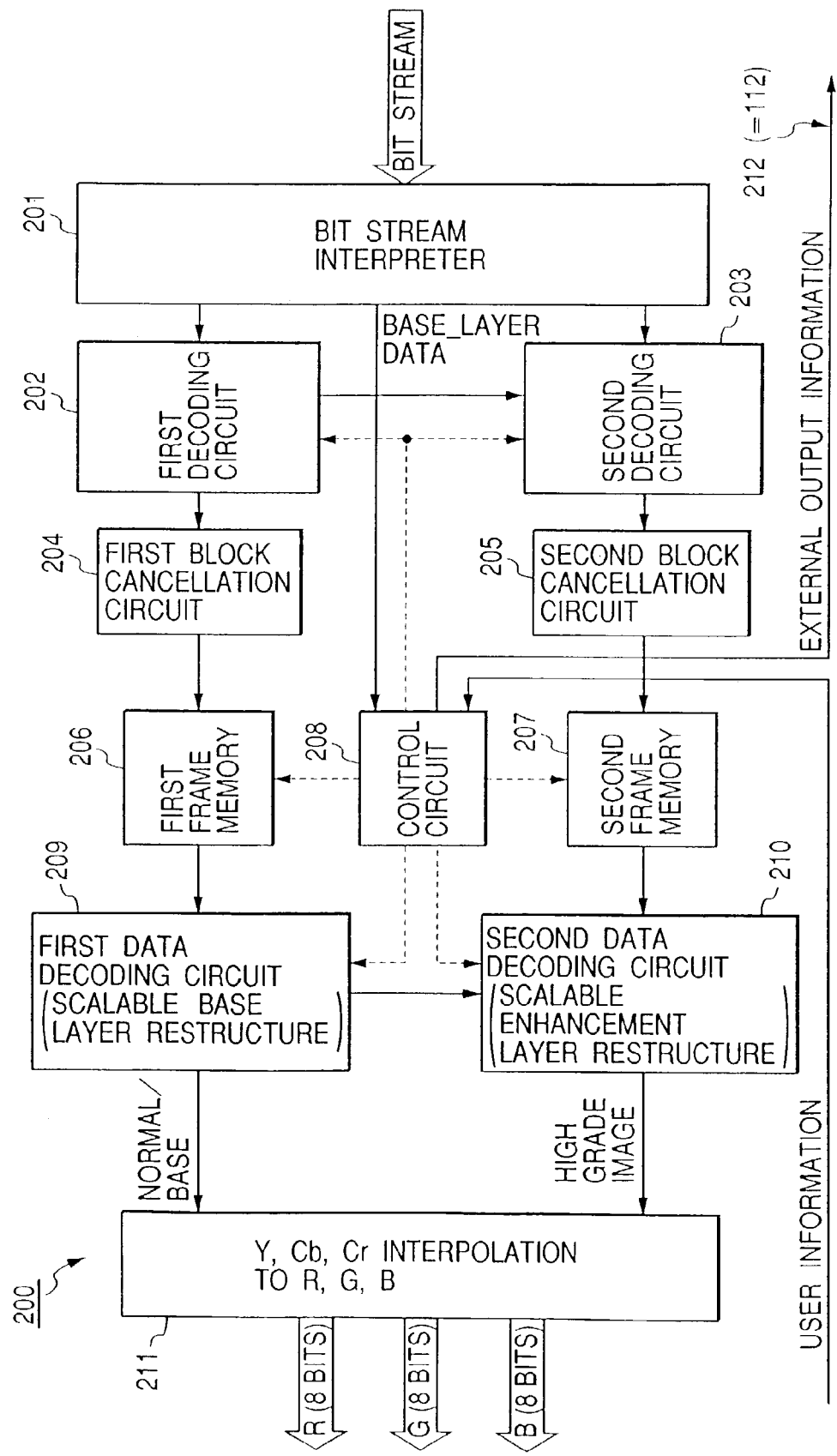
FIG. 8 is a block diagram showing a decoding device in the first embodiment of the present invention.

An explanation of the decoding device follows. The decoding device is used to decode the encoded data generated by the encoding device, described above. FIG. 8 shows the block diagram of a decoding device 200 to which the present invention is applied.

The decoding device 200 corresponds to the encoding device 100 of the first embodiment of the present invention.

In other words, the decoding device 200 performs the reverse processing of the encoding device 100. In particular, user information (provided by a user), described below, can be input into the decoding device 200. This user information includes various information such as image quality and capabilities of the decoding device 200, for example.

Therefore, users of the decoding device 200 may input various information related to the decoding, which causes a control circuit 208 to gene-rate an external output information 212 based on the user input. This external output information is supplied to the encoding device 100 as the external information 112, explained above.

Figure 9:
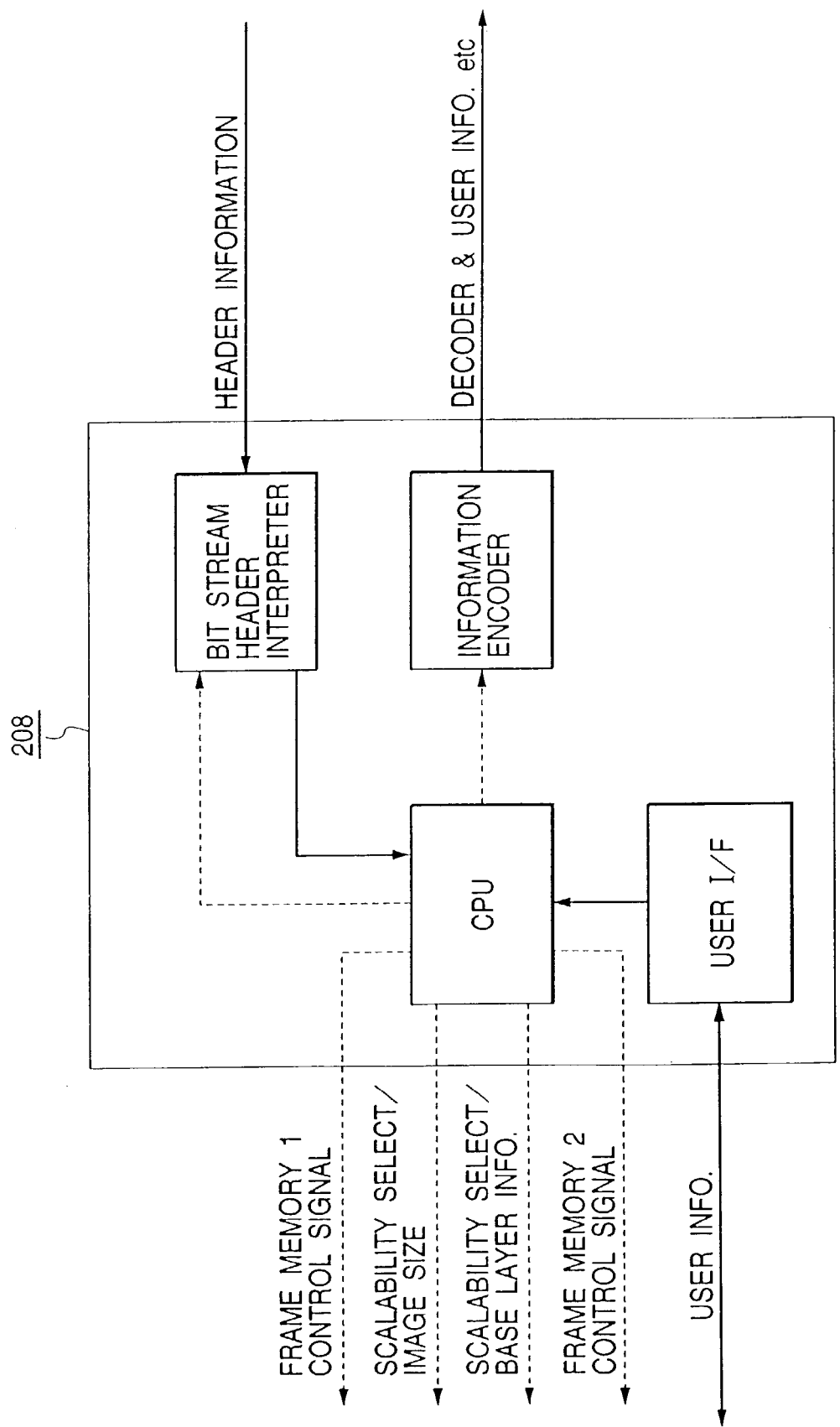
FIG. 9 is a block diagram showing the internal structure of a control circuit 208.
Figure 10:
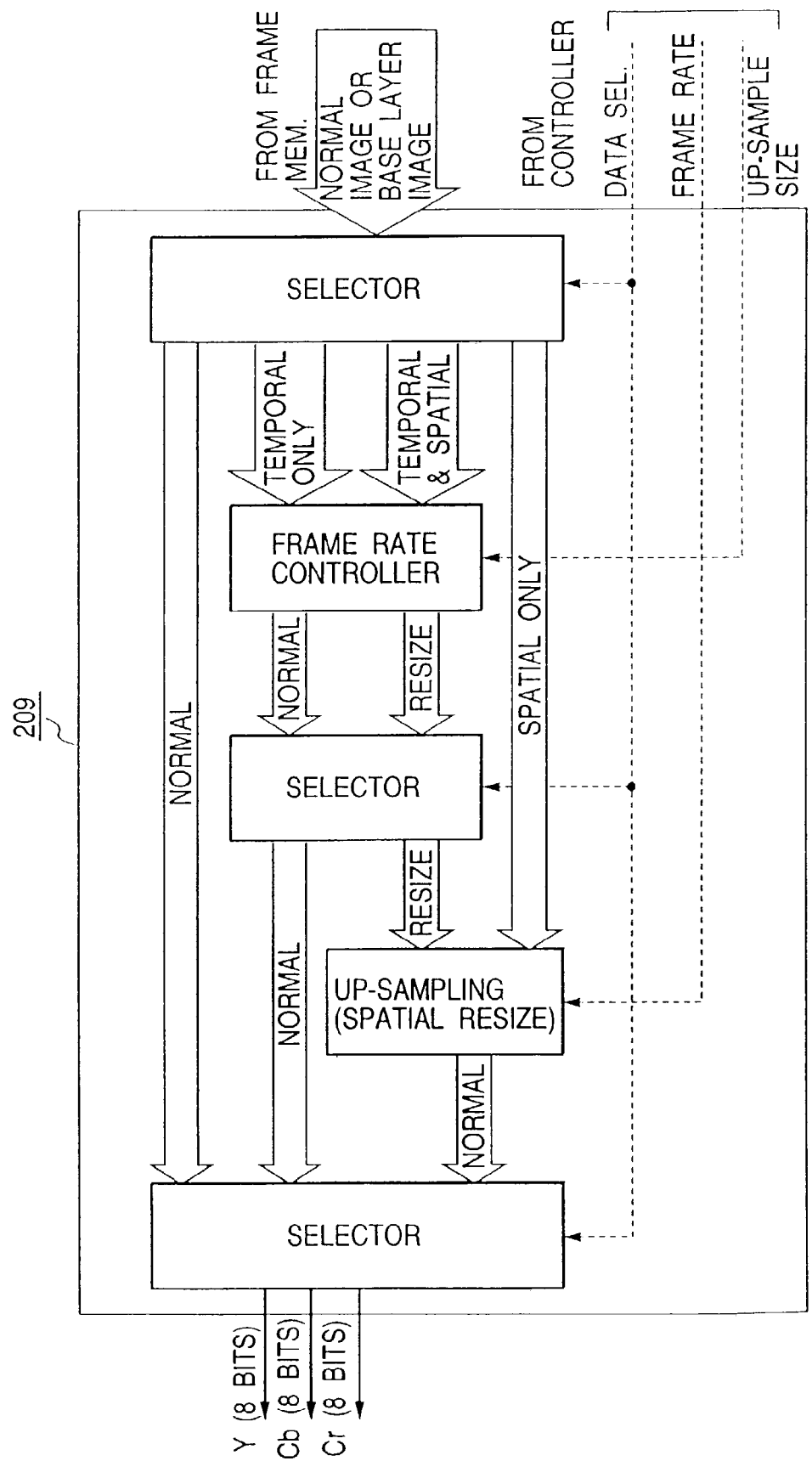
FIG. 10 is a block diagram showing the internal structure of a first data decoding circuit 209.
Figure 11:
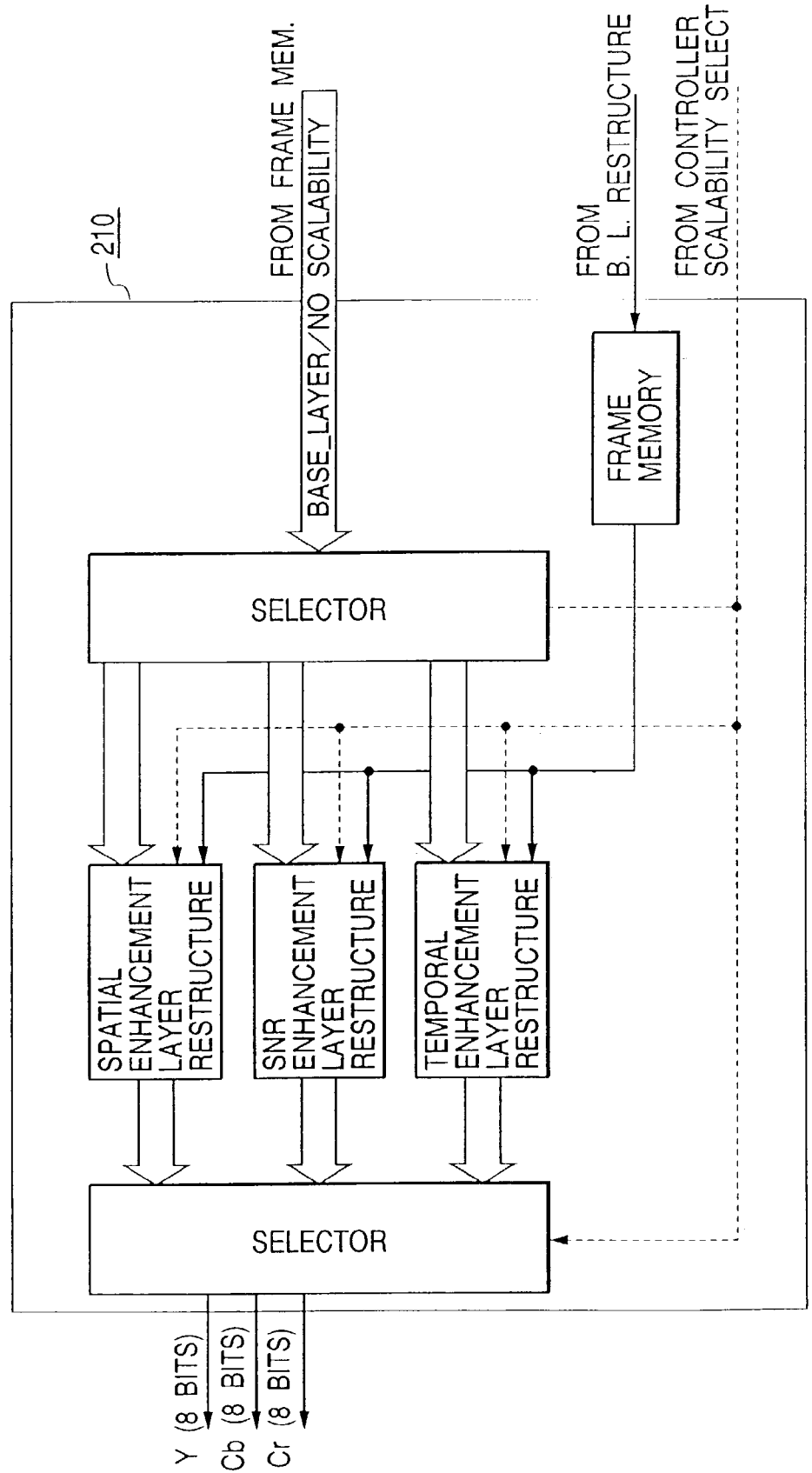
FIG. 11 is a block diagram showing the internal structure of a second data decoding circuit 210.

A detailed explanation of setting user information follows, but such the decoding processing can be taken as the exact opposite of the encoding processing, the explanation of the decoding processing is omitted here. In addition, explanations of the following FIGS. 9 to 11 are omitted because circuit shown in those figures operates in a manner exactly opposite to corresponding circuits in the encoding device 100. FIG. 9 shows the internal structure of the control circuit 208, FIG. 10 shows the internal structure of a first data decoding circuit 209 in the decoding device 200, and FIG. 11 shows the internal structure of a second data decoding circuit 210 in the decoding device 200.

The input method of the user information is explained next.

Figure 12:
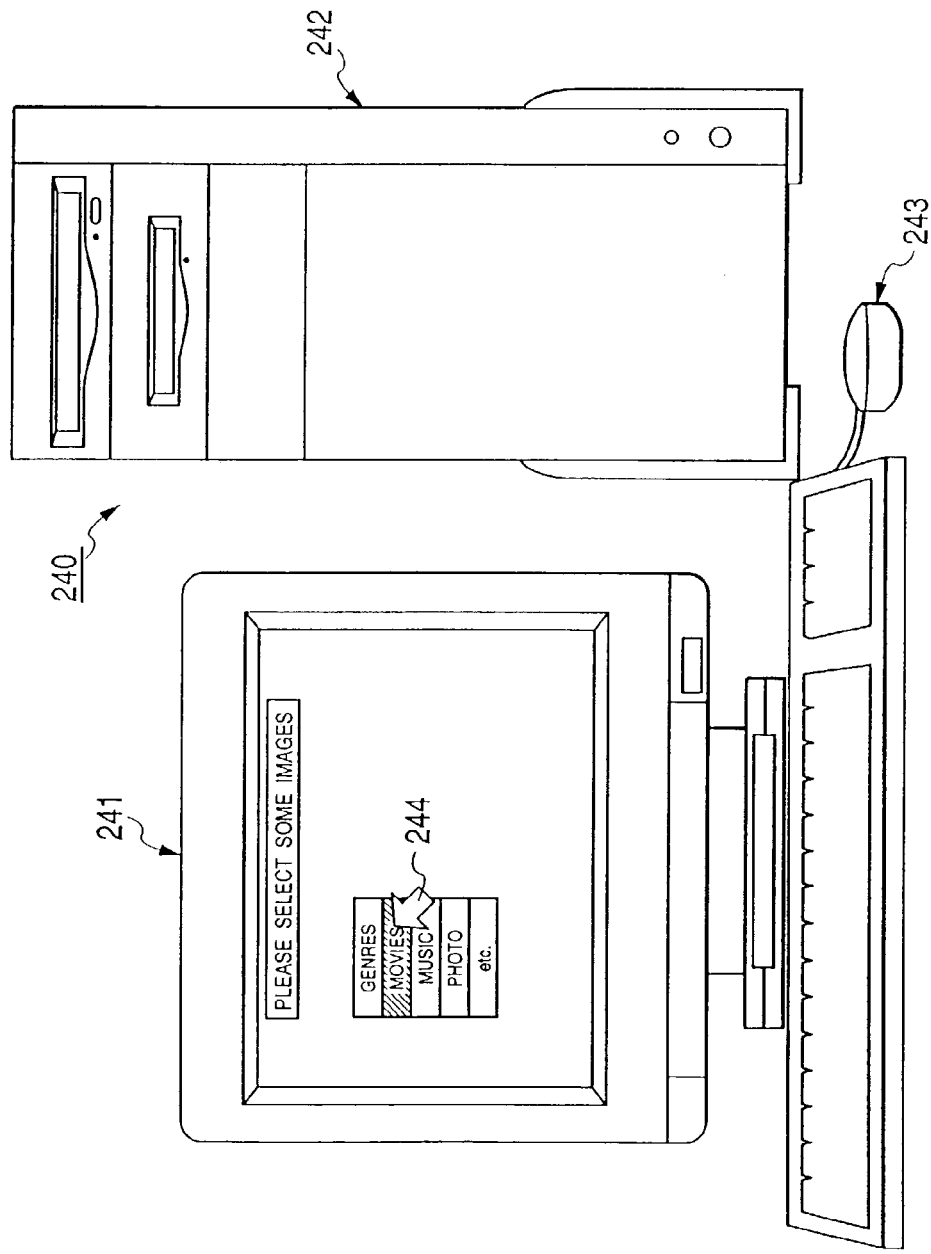
FIG. 12 shows an image processing system that contains the functions of the decoding device of FIG. 8.

FIG. 12 shows the structure of a system 240 that has the functions of the decoding device 200 of FIG. 8.

As FIG. 12 shows, the system 240 comprises a monitor 241, a personal computer (PC) body 242, and a mouse 243, which are connected to each other.

The PC 242 contains the functions of the decoding device 200 shown in FIG. 8.

First, genre selection menu screen for selectable software (moving picture) is displayed on the monitor 241 in the system 240. For example, "movie", "music", "photo", as well as "etc." are displayed on the menu screen.

The user operates the mouse 243 and specifies the desired software genre from those displayed on the monitor screen. For example, specifically, a mouse cursor 244 is lined up with the desired software genre ("movie" in FIG. 12), and the mouse 243 is clicked or double clicked. This operation designates the "movie" genre.

Figure 13:
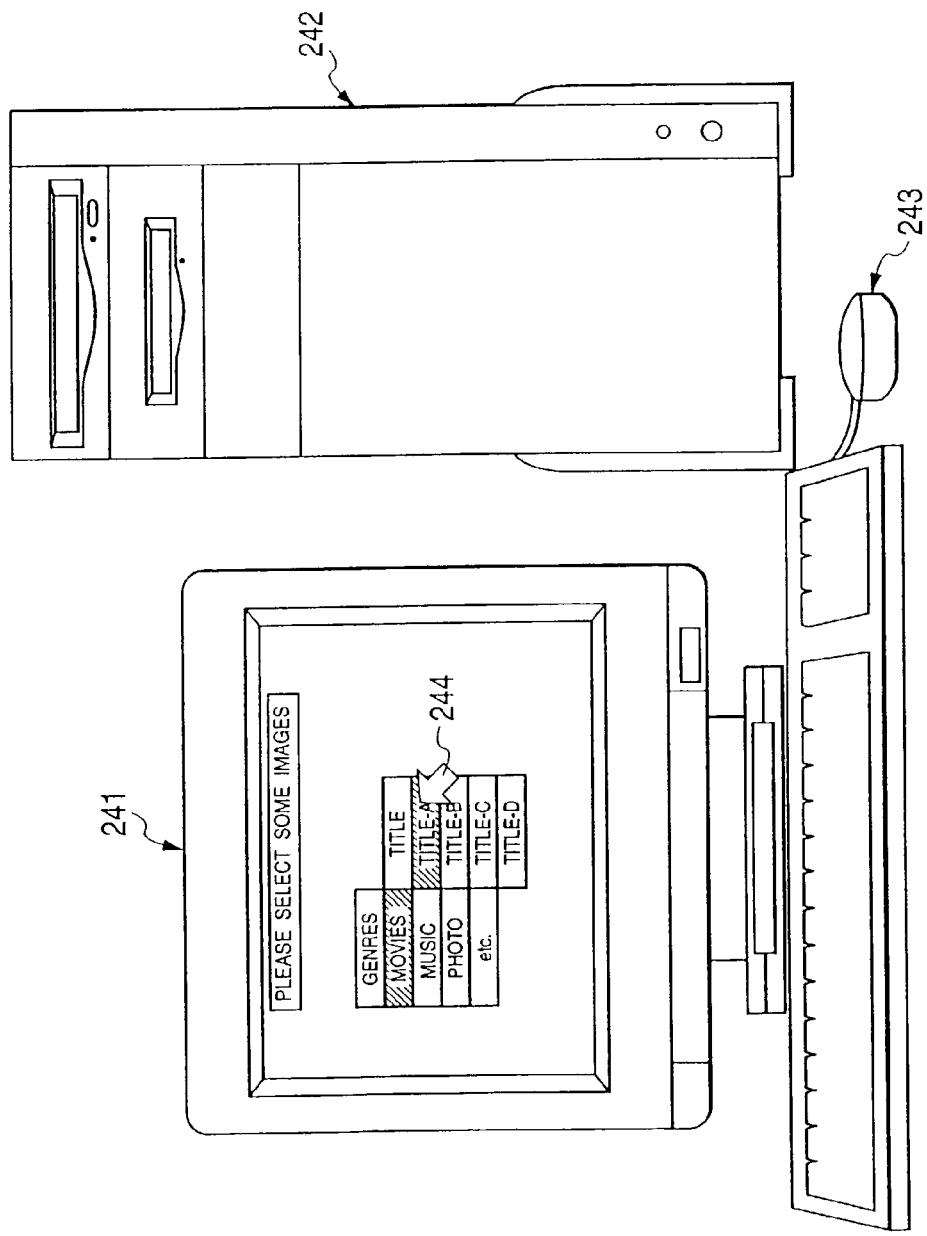
FIG. 13 is a view showing the selecting operation from a genre title menu.

After this operation is finished, a menu screen such as that shown in FIG. 13 is displayed. This menu screen lists individual titles corresponding to the genre set ("movie") at the genre selection menu of FIG. 12. For example, the title menu displayed lists "title-A", "title-B", "title-C", and "title-D", corresponding to the individual "movies".

The user operates the mouse 243 and designates the desired title from those displayed on the screen. Specifically, for example, the mouse cursor 244 is lined up with the desired title ("title-A" in FIG. 13), and the mouse 243 is clicked or double clicked. This operation designates the "title-A" title.

Figure 14:
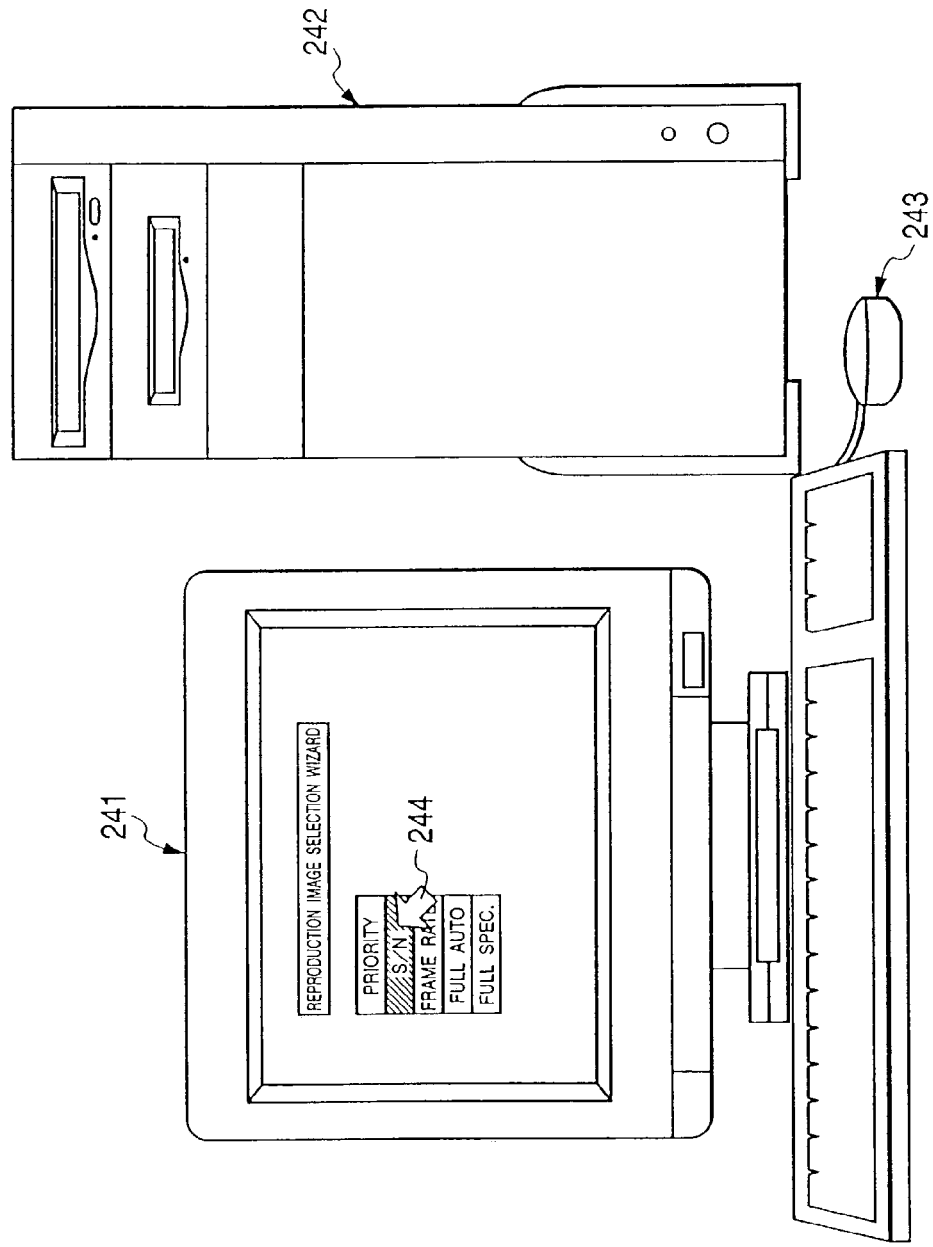
FIG. 14 shows the condition setting screen that results from title selection in FIG. 13.

After this operation is finished, a condition setting screen such as that shown in FIG. 14 is displayed. This condition setting screen is for setting various conditions of decoding the data of "title-A" designated at the title selection menu of FIG. 13. In the present embodiment, the following conditions may be set:

S/N: designate one of low image quality (Low), high image quality (High), and optimal image quality based upon the system's decoding capabilities (Auto), Frame Rate: designate one of low frame rate (Low), high frame rate (Full), and an optimal frame rate based upon the system's decoding capabilities (Auto), Full Spec: designate highest image quality (high encoding volume) for the encoder (the encoding device 100 of FIG. 4), and Full Auto: set various optimal conditions based upon the system's decoding capabilities.

Figure 15:
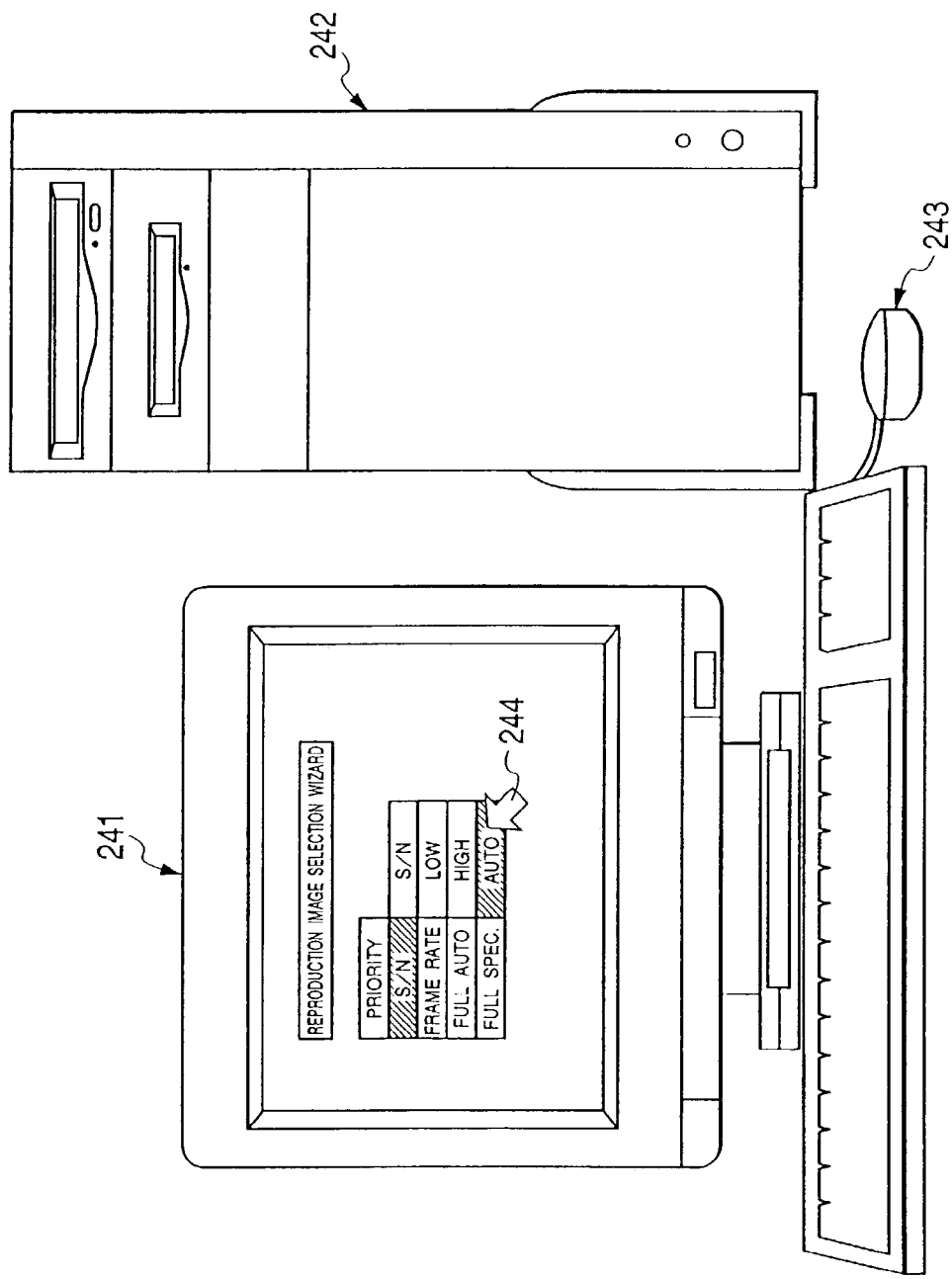
FIG. 15 shows the operation of setting further desired conditions after the condition setting screen shown in FIG. 14.

Therefore, as shown in FIG. 14, the user moves the mouse cursor 244 to line up with the desired condition to be set ("S/N" in FIG. 14), and clicks or double clicks the mouse 243. This causes a detailed S/N condition menu to be displayed, as shown in FIG. 15. The "Low", "High", and "Auto" are displayed as the conditions to be set.

The user then moves the mouse cursor 244 to line up with the desired S/N setting ("Auto" in FIG. 15), and clicks or double clicks the mouse 243. This selects the "Auto" setting for "S/N", meaning that the system 240 will automatically set the optimal image quality based on its decoding capabilities.

The information about each of the conditions set on the screen described above is supplied as external information 112 to the encoding device 100, described above in the first embodiment of the present invention.

As described above, the encoding device 100 receiving the information 112, interprets the external information 112, selects the optimal scalability, determines the settings for each condition required for the optimal scalability (image size, compression ratio, etc.), performs encoding processing, and outputs the result to the system 240 (decoding device 200) of FIG. 12.

Figure 16:
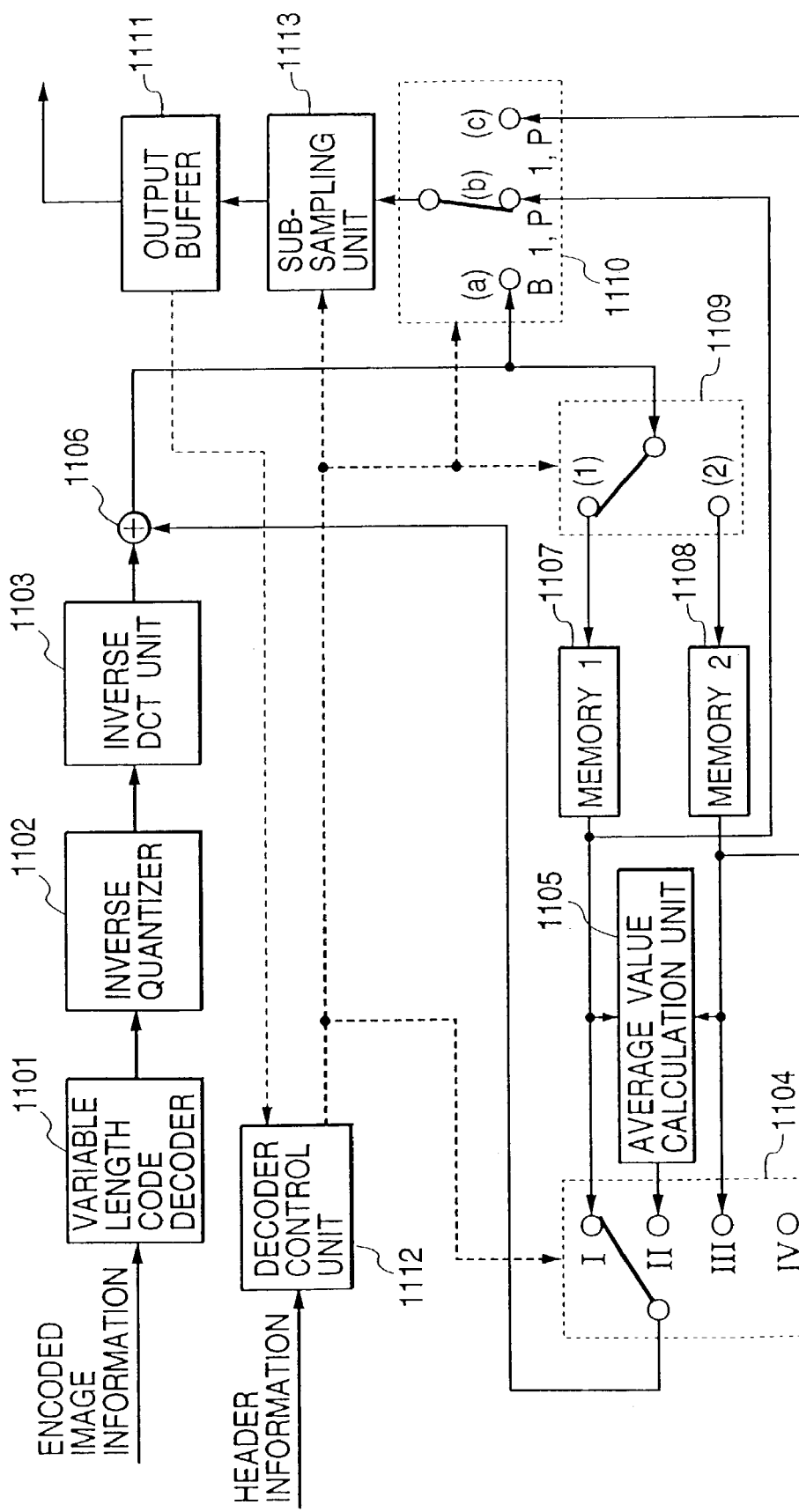
FIG. 16 is a block diagram showing the structure of a decoder in a second embodiment according to the present invention.

FIG. 16 shows a block diagram of the structure of a decoder in a second embodiment according to the present invention.

In FIG. 16, a variable length code decoder 1101 performs variable length code decoding on a coded image information that is input, and an inverse quantizer 1102 performs inverse quantizing on the decoded data output from the variable length code decoder 1101. An inverse DCT unit 1103 performs inverse DCT processing on the inverse quantized data output from the inverse quantizer 1102.

A selector 1104, a selector 1109, and a selector 1110 switch the input data under control by a decoder control unit 1112. An average value calculation unit 1105 calculates average values between data stored in a memory #1 (1107) and a memory #2 (1108). An adder 1106 performs addition operations on the inverse DCT data output from the inverse DCT unit 1103 and the data output from the selector 1104.

The memories 1107 and 1108 that act as a data buffer for a decoded signal, store the data output from the selector 1109. An output buffer 1111 stores the sub-sampling data output from a sub-sampling unit 1113. The decoder control unit 1112 controls the sub-sampling unit 1113, as well as the selectors 1104, 1109, and 1110. The sub-sampling unit 1113 performs sub-sampling operations on the decoded image data stored in the output buffer 1111.

The decoding system, which includes the decoder of FIG. 16, will now be explained with reference to FIG. 17.

Figure 17:
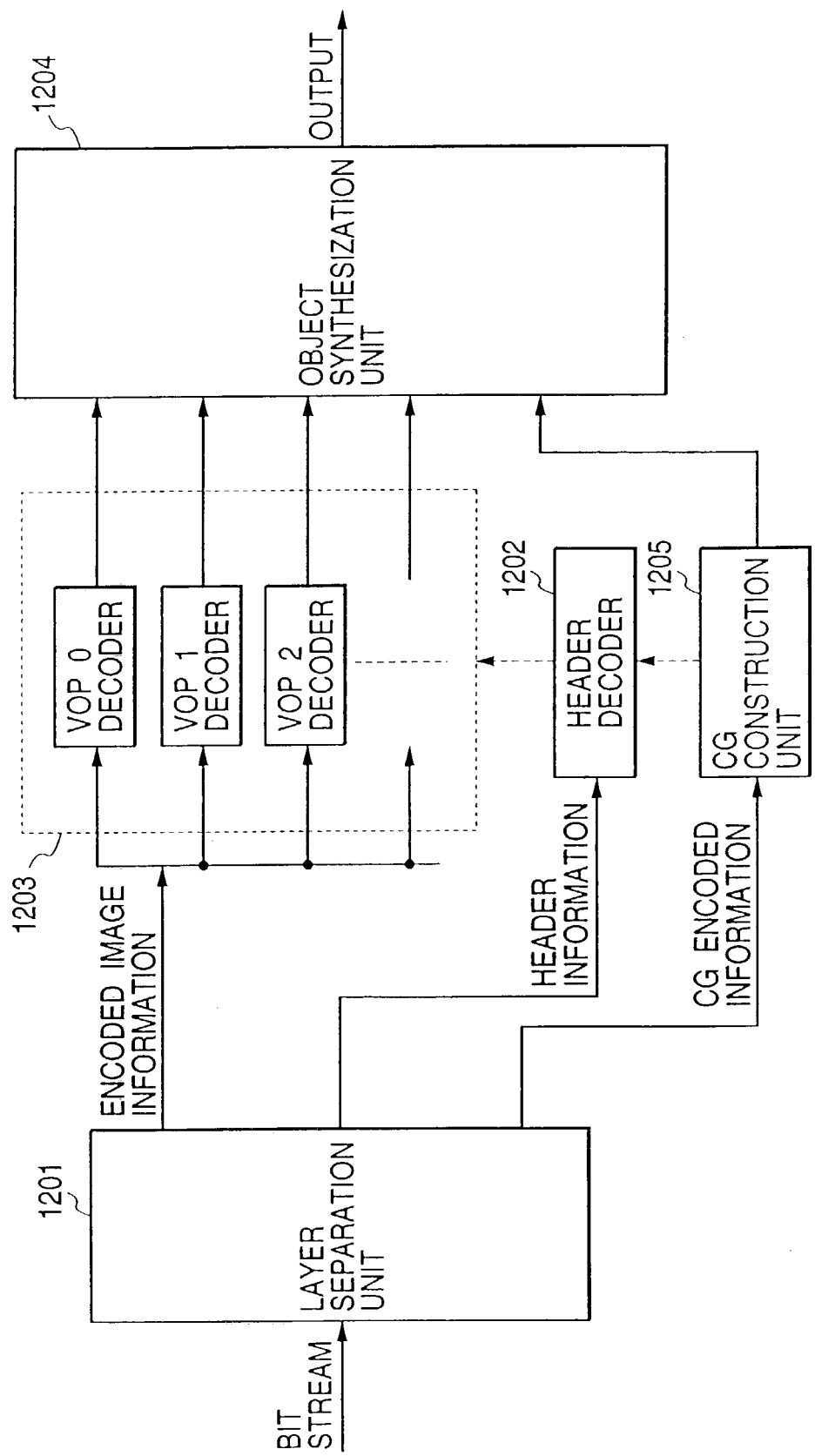
FIG. 17 is a block diagram showing the structure of a decoding system in the second embodiment according to the present invention.

FIG. 17 shows a block diagram of the structure of a decoding system in the second embodiment according to the present invention.

A hierarchy separation unit 1201 shown in FIG. 17 interprets the header information on the bit stream, which also includes the encoded image information, and then separates each frame (picture) into hierarchies (objects). A header decoder 1202 decodes the separated header information from the hierarchy separation unit 1201 and interprets decoded header to provide control information to a decoder group 1203 comprising the decoder shown in FIG. 16. The decoder group 1203 decodes the encoded image information that has been separated into object units by the hierarchy separation unit 1201.

A CG construction unit 1205 receives encoded CG information to reconstruct face animation and other CG images. The CG construction unit 1205 possesses the function of constructing CG image by texture mapping or polygon processing with a software processing. An object synthesization unit 1204 constructs a single picture (frame) by synthesizing each decoded object.

The encoding system corresponding to the decoding system will be explained with reference to FIG. 18.

Figure 18:
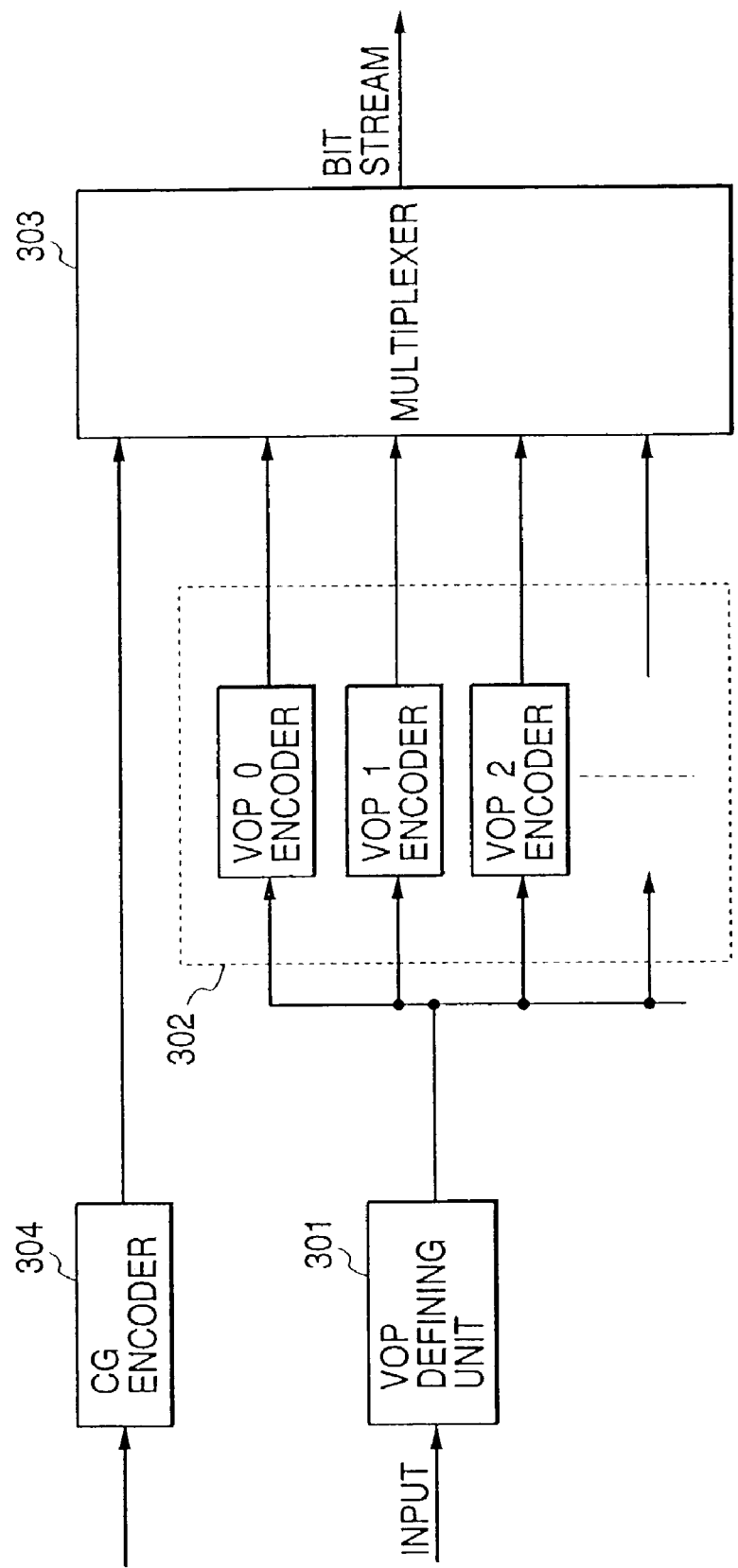
FIG. 18 is a block diagram showing the structure of an encoding system in the second embodiment according to the present invention.

FIG. 18 shows a block diagram of the structure of the encoding system in the second embodiment according to the present invention.

A VOP defining unit 1301 is shown in FIG. 18. The VOP (Video Object Plane) defining unit 1301 separates a digital image in units of a single picture (frame, or field) into (cuts out) a plurality of objects. An encoder group 1302 performs independent encoding of each object separated by the VOP defining unit 1301.

A multiplexer 1303 gathers each of the encoded objects from the encoder group 1302 into a single bit stream. A CG encoder 1304 encodes the CG image mesh information (location, shape).

The each decoder (object units) that make up the decoder group 1203 of the decoding system shown in FIG. 17, includes a decoder shown in FIG. 17 except for the CG construction unit 1205, and each decoder has the same specifications. The CG construction unit 1205 is basically constructed of software to generate the CG images, and a texture image library of the component parts that make up the images.

FIGS. 16 and 17 will next be used to explain the operation of the decoder system.

As FIG. 17 shows, the input bit stream is separated into encoded image information, header information, and CG encoded information by the hierarchy separation unit 1201. The encoded image information is input to the decoder group 1203, the header information is input to the header decoder 1202, and the encoded CG information is input to the CG construction unit 1205. Each is then decoded. The header information decoded by the header decoder 1202, used as control information for the various functions of the decoders, is input into the decoder group 1203. In addition, when encoded CG information is input into the CG construction unit 1205, a CG image (face animation, etc.) is constructed by calculating the texture shapes in accordance with the input information to arrange the calculated shapes on a mesh, etc.

An explanation of the processing that takes place in the decoder group 1203 is given below, with reference to FIG. 16.

Encoded image information is input into the variable length code decoder 1101, and control information (header information) is input to the decoder control unit 1112. The decoder control unit 1112 generates a control signal for controlling various functions of the decoder, using the control information (header information) and information as to space areas of output buffer 1111, to control the selectors 1104, 1109 and 1110 and the sub-sampling method used—in the sub-sampling unit 1113.

The encoded image information is processed as follows. Variable length codes are decoded by the variable length code decoder 1101, inverse quantization processing is performed on the decoded codes by the inverse quantizer 1102, and then inverse DCT processing is done by the inverse DCT unit 1103. If the header information input to the decoder control unit 1112 shows that the decoding mode for the image data currently being processed is "intra", the decoder control unit 1112 sets the selector 1104 to IV, leaves the selector 1109 in the present state, and sets the selector 1110 to either (b) or (c). In this case, with the selector 1104 set to IV (numerically zero), the inverse DCT processed image data is stored in the memory #1 (1107) or the memory #2 (1108) as they are.

On the other hand, if the header information shows that the decoding mode for the image data currently being processed is "inter (forward prediction)", the decoder control unit 1112 sets the selector 1104 to either I or III, sets the selector 1109 to either (2) or (1) (if the selector 1104 is set to I, then sets to (2), if it is set to III, then set s to (1)), and sets the selector 1110 to either (b) or (c) ((b) for if the selector 1109 is set to (1), (c) for if it is set to (2)). Then the decoded reference image data, stored in either the memory #1 (1107) or the memory #2 (1108), is read out in accordance with the motion vector, and added to the inverse DCT processed image data by the adder 1106. This completes the decoding of the image data.

The completely decoded image data is then stored in the memory #2 (1108) (the selector 1109 set to (2)) if the reference image data used for decoding is read out from the memory #1 (1107) (selector 1104 set to I). If, however, the reference image data is read out from the memory #2 (1108), the decoded image data is stored in the memory #1 (1107) (selector 1109 set to (1)). At the same time, the decoded image data is output to the sub-sampling unit 1113 and the output buffer 1111, via the selector 1110 (contact point (c) or (b)).

Further, if the header information shows that the decoding mode for the image data currently being processed is "inter (bi-directional prediction)", the decoder control unit 1112 sets the selector 1104 to II, sets the selector 1110 to (a), and leaves the selector 1109 in the present state. Then the decoded reference image data, stored in either of the memory #1 (1107) and the memory #2 (1108), is read out in accordance with the motion vector, and the average of the two read-out data is calculated by the average value calculation unit 1105. This average is output from the selector 1104 (contact point II), and added to the inverse DCT processed image data by the adder 1106, thereby completing the image data decoding. Then, the decoded data output to the sub-sampling unit 1113 and the output buffer 1111, via the selector 1110 (contact point (a)). Note that image data decoded by bi-directional prediction is not used by any further decoding processes, and is therefore not stored in either memory #1 (1107) or memory #2 (1108).

The above sequential processing stores the decoded image data in the output buffer 1111, which can then be read out to a CRT or other display device at the rate it requires.

The amount of decoded image data will generally change with time, and the available space in the buffer 1111 will change in tandem with that amount of the decoded image data. The decoder control unit 1112 regularly monitors the available space in the output buffer 1111, and if the decoder control unit 112 determines that an overflow may occur, it instructs the sub-sampling unit 1113 to perform optional sub-sampling on the decoded image data, thereby avoiding overflow of the output buffer 1111.

In addition, the decoder control unit 1112 also monitors header information of image data to be decoded. If the amount of encoded image information increases rapidly, it determines that the amount of image data stored in the output buffer 1111 may rapidly rise, and once again instructs that optional sub-sampling on the decoded image data be performed.

Sub-sampling is explained next, with reference to FIGS. 19A and 19B.

Figure 19A:
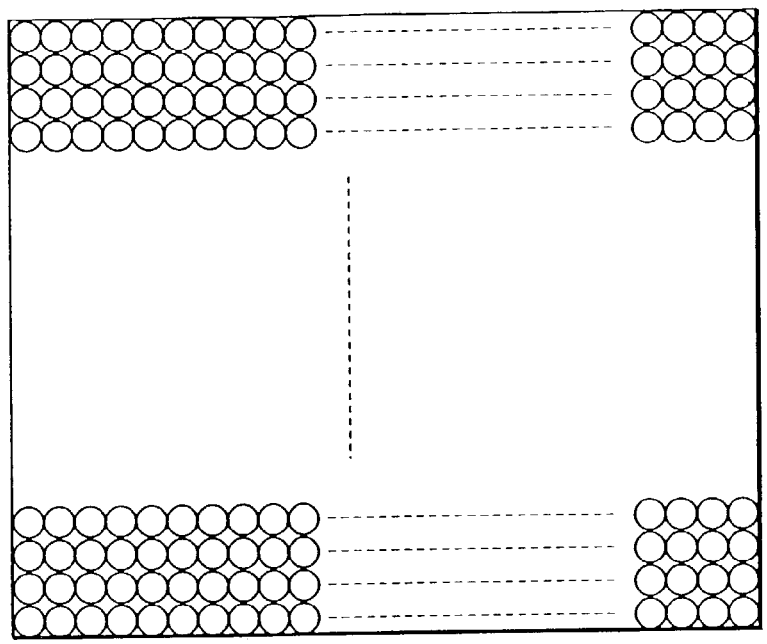
FIGS. 19A and 19B show an example of image data sub-sampling according to the present invention.
Figure 19B:
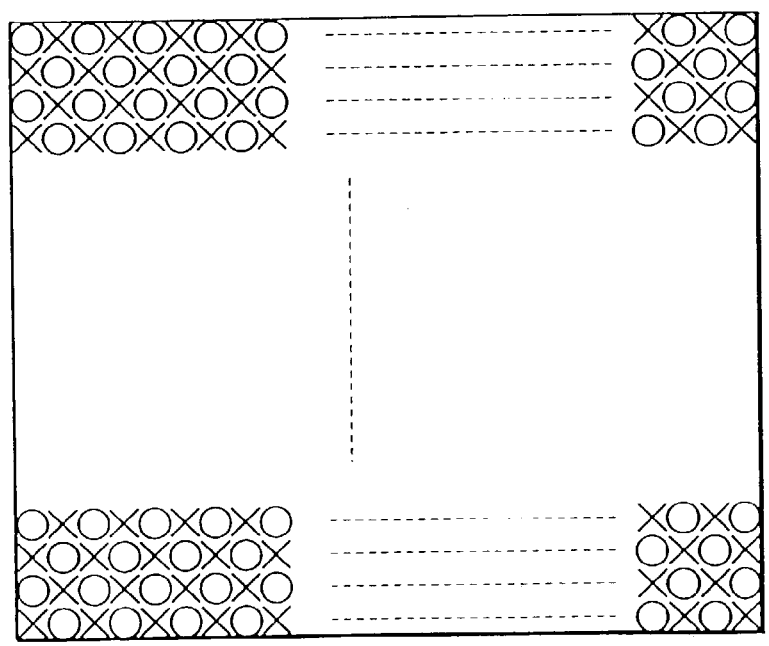

FIG. 19A shows the image to be thinned out, and FIG. 19B shows the thinned-out image. The thinning-out process removes every other pixel on each horizontal line of the image by reversing a thinning-out phase every other line, thereby reducing the number of the horizontal pixels by one-half (reduces the horizontal resolution by one-half).

A post filter (interference removal filter) is disposed after the sub-sampling unit 1113 to eliminate interference caused by spatial frequencies upon sub-sampling. The sub-sampling processing to thin out the decoded image data and avoid overflow in the output buffer 1111 takes place in object units in each of the decoders of decoder group 1203 in FIG. 17. In addition, since sub-sampling is performed in object units, if the decoder control unit 1112 determines that the factor of overflow in the output buffer 1111 has been eliminated, it is programmed to stop sub-sampling with a predetermined delay after such the determination.

Next, the process flow that occurs inside the decoder in the second embodiment is explained with reference to FIG. 20.

Figure 20:
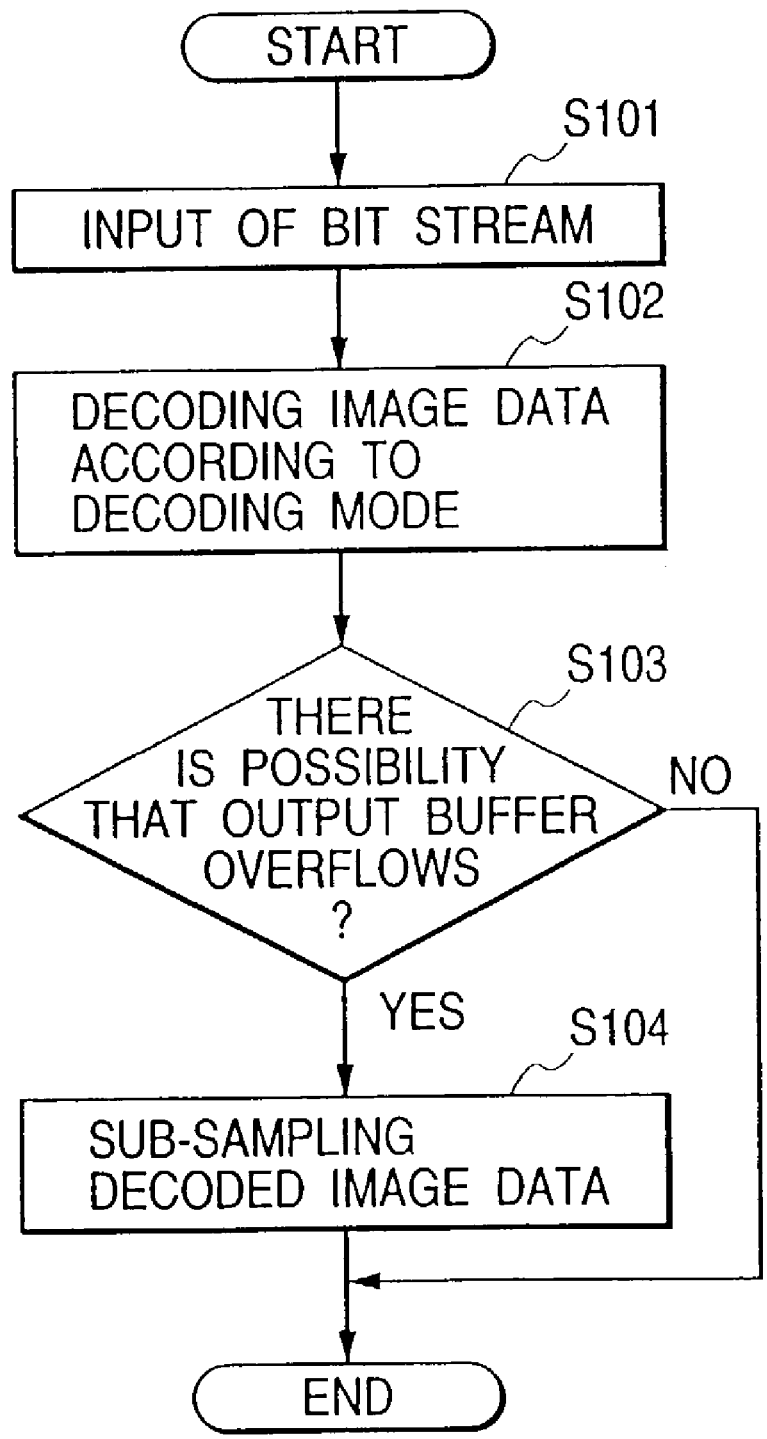
FIG. 20 shows a flowchart of the processing that takes place in the decoder of the second embodiment of the present invention.

FIG. 20 shows a flowchart of the processing that takes place in the decoder of the second embodiment according to the present invention.

First, the bit stream is input in a step S101. In a step S102, the input bit stream is then separated into header information, encoded image information, and encoded CG information. The encoded image information is then decoded according to the decoding mode designated by the header information. A step S103 checks whether or not there is a possibility that the output buffer 1111, which will store the decoded image data, is about to overflow. If there is the possibility of overflow (YES in step S103), the processing proceeds to a step S104, where sub-sampling of the decoded image data takes place. If there is no possibility of overflow (NO in step S103), then the processing is finished.

As explained above, with the second embodiment of the present invention, if the output buffer 1111 appears to be in an overflow condition during the decoding processing of the input bit stream, sub-sampling is instantly performed until the amount of decoded image data stored in the output buffer 1111 is reduced. The temporary sacrifice in spatial resolution of the decoded image is used to avoid an interruption in decoding processing or an accompanying mix-up in decoded images.

Next, decoding processing where the bit stream employs scalability is described as a third embodiment of the present invention.

Figure 21:
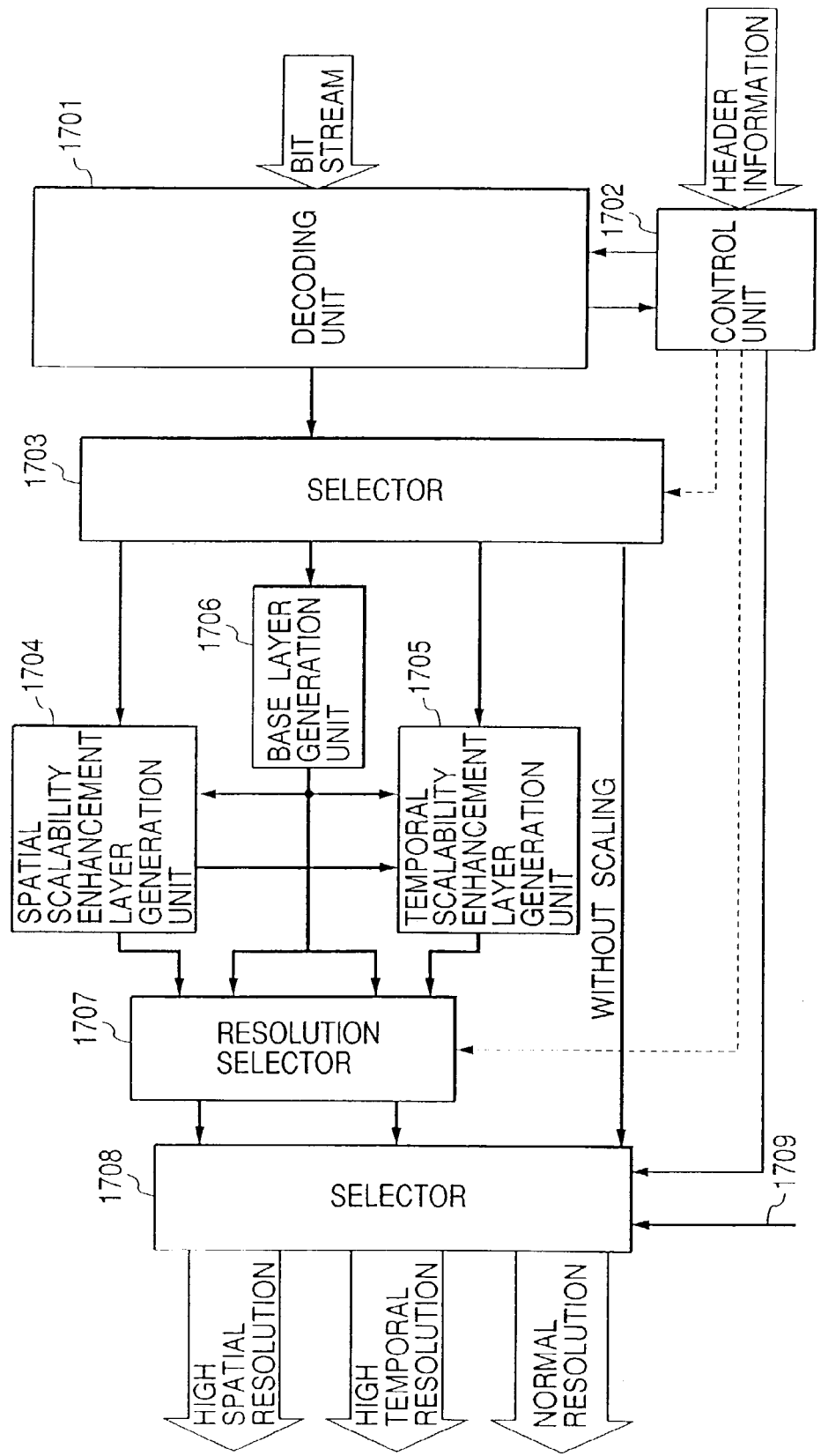
FIG. 21 is a block diagram showing the structure of a decoder in a third embodiment according to the present invention.

FIG. 21 shows a block diagram of the structure of a decoder of the third embodiment according to the present invention.

In FIG. 21, a decoding unit 1701 has the same construction as that shown in FIG. 16, although the sub-sampling unit 1113 is not necessary. A control unit 1702 controls each component of the decoders. A selector 1703 and a selector 1708 both perform switching functions on the input data.

A spatial scalability enhancement layer generation unit 1704 generates the enhancement layer image during spatial scalability operation. A temporal scalability enhancement layer generation unit 1705 performs a similar function during temporal scalability operation by generating the enhancement layer image. A base layer generation unit 1706 generates the base layer image for both spatial scalability and temporal scalability operation. A resolution selector 1707 switches the input data. Finally, a selection signal 1709 is the input signal provided by the user.

The decoding system employed in the third embodiment of the present invention has the same specifications as the decoder group 1203 shown in FIG. 17, employing of the decoder explained in FIG. 21. In addition, the functions of each decoder and the CG construction unit 1205 have been realized by the combination of an arithmetic unit (hardware) and software (program) that satisfies all of the functions shown in FIG. 21.

Next, operation of the decoding system of the third embodiment of the present invention is described, with reference to FIGS. 17 and 21.

As FIG. 17 shows, the input bit stream is separated into encoded image information and header information by the hierarchy separation unit 1201. The encoded image information is input to the decoder group 1203, while the header information is sent to the header decoder 1202, and each is then decoded. The header information decoded by the header decoder 1202 is then input to the decoder group 1203 as control information for each of the functions of the decoder group 1203.

The various processes that occur in the decoder group 1203 will be explained below with reference to FIG. 21.

As FIG. 21 shows, the encoded image data that has been separated by the hierarchy separation unit 1201 is input to the decoding unit 1701, and the control information (header information), decoded by the header decoder 1201, is input to the control unit 1702.

The input control information (header information) is first interpreted by the control unit 1702, and the control specifications needed for decoding, such as encoding mode and information related to scalability, are input to the decoding unit 1701. In addition to the function for interpreting the control information (header information), the control unit 1702 has the function for monitoring both the processes that occur in the decoding unit 1701, and memory. Thereby, an operation state of the decoding unit 1701 is taken into consideration as the control information.

The encoded image information undergoes decoding processing by the decoding unit 1701, such as variable length decoding, inverse quantizing, and inverse DCT processing, in accordance with the control information (header information) from the control unit 1702. The result of the decoding processing is then sent to the selector 1703.

If the bit stream input into the decoding unit has been encoded by using scalability, information about the scalability used is generally transmitted as the header information.

Therefore the control information generated by the control unit 1702 is sent to the decoding unit 1701, the selector 1703, as well as the resolution selector 1707. Both the base layer image and the enhancement layer image are reconstructed according to spatial or temporal scalability.

High resolution is basically the default selection for the reconstructed image. However, there are two cases wherein the control unit 1702 and the CG construction unit 1205 determine that the decoding process has failed. One of such the two cases is that it is determined as result of the interpretation of the bit stream header information by the control unit 1702 that the capabilities of the decoding unit 1701 do not allow for normal processing. The other case is that the CG construction unit 1205 determines that the encoded CG information input to the CG construction unit 1205 exceeds its processing capabilities, or an another request for processing of encoded CG information is received during the processing of encoded CG information by the CG construction unit 1205. In these two cases, processing of the enhancement layer (high resolution information) is halted regardless of the selection signal 1709, and only the base layer is decoded to be output from the selector 1708.

In addition, in case of that the control unit 1702 detects or predicts a failure (real-time decoding inability or input/output buffer overflow) of the bit stream decoding processing, caused by a rapid increase of frequency of appearance of intra-frames or intra-macro blocks, processing of the enhancement layer (high resolution information) is halted regardless of the selection signal 1709 and only the base layer image is decoded to be output from the selector 1708.

Also, in case of that the CG construction unit 1205 generates to the control unit 1202 a flag indicating that it is unable to continue processing when the amount of encoded CG information rapidly increases and then the load on the CG construction unit 1205 by software also rapidly increases to exceed capabilities of CG construction unit 1205, processing of the enhancement layer (high resolution information) is halted regardless of the selection signal 1709 and only the base layer is decoded to be output from the selector 1708.

By reserve power in the decoder group 1203 that is brought about as a result of halting enhancement layer decoding, that is, by using processing capability of an arithmetic apparatus for processing of encoded CG information, construction of the CG image is completed normally. It is programmed that the control unit 1702 returns to a normal operation after the N-frame (or field) delay time is elapsed from time when the control unit 1702 interprets header information when input, and it determines that normal processing of the bit stream is possible.

As explained above, in case of that when many encoded CG information is input by a bit stream using scalability, and then the load on the decoder group 1203 rapidly increases, the control unit 1702 determines that the continuation of normal decoding processing is impossible, an operation is set to a fixed mode wherein the enhancement layer image of each object is halted and only the base layer (low resolution) image is output. According to this structure of the present invention, load of a decoding operation except for decoding operation of the encoded CG information can be reduced, and the reserve computing power can be apportioned to the CG construction unit 1205, and thereby normal decoding operations can be maintained without visible interruption (with no image freezes or no loss of objects).

The third embodiment of the present invention is constructed so that the selection signal 1709 from outside of the system is received to control the selector 1708. Therefore a user has the option of inputting the selection signal 1709 from the outside. If the bit stream (encoded image information) uses the spatial scalability, then either high or low spatial resolution may be selected by the selection signal 1709, and if the bit stream uses the temporal scalability, then either high or low temporal resolution (frame rate, etc.) may be selected by the selection signal 1709.

Next, the process flow that occurs in the decoder of the third embodiment of the present invention will be discussed with reference to FIG. 22.

Figure 22:
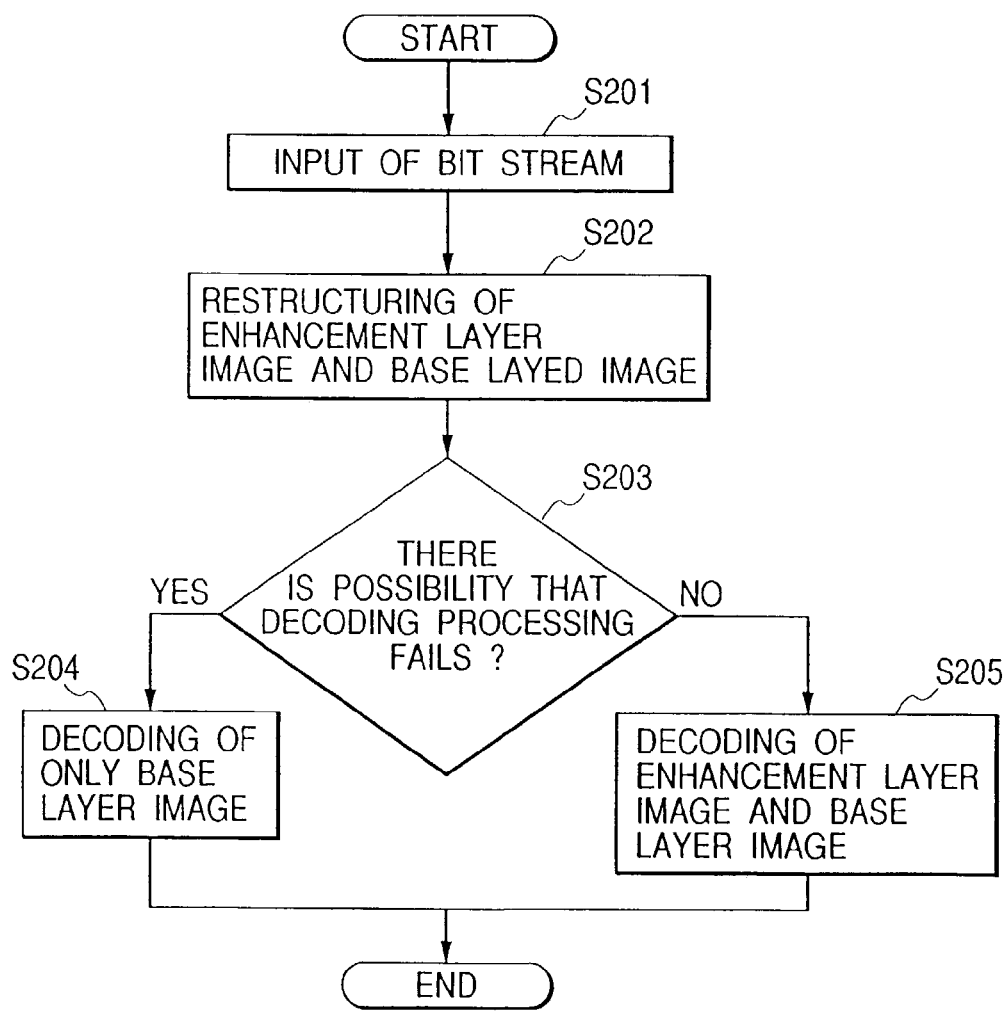
FIG. 22 is a flowchart showing the processing that takes place in the decoder of the third embodiment according to the present invention.

FIG. 22 is a flowchart showing the processing that takes place in the decoder of the third embodiment according to the present invention.

First, the bit stream is input in a step S201. Then the enhancement layer and base layer images are reconstructed from in the input bit stream in a step S202. A step S203 determines whether or not there is possibility that the decoding processing may fail. If there is a possibility of failure (YES in step S203), then processing proceeds to a step S204, which decodes only the base layer image. If there is no possibility of failure (NO in step S203), then processing proceeds to a step S205, which decodes both the base layer and enhancement layer images.

As explained above for the third embodiment of the present invention, in case of that the bit stream employs scalability, potential buffer overflows and failures in the decoding process (decoding cannot keep up with the rate of input) are detected to immediately halt the enhancement layer and switch to the decoding processing of the base layer image. According to this structure, with the temporary sacrifice in temporal or spatial resolution, interruption in decoding processing or an accompanying mix-up in decoded images, and freezes, etc. can be avoided.

In addition, with a predetermined delay time from stop of an abnormal operation with sub-sampling or forced decoding (low resolution) of only the base layer image to return to a normal processing, it can be avoided that the slight variations in decoded image data amount results in repeated changing from normal processing to abnormal processing and back again.

The present invention may be applied to a system constructed of several machines (for example, a host computer, interface unit, reader, printer, etc.), and it may also be applied to a device (for example, a copier, facsimile, etc.) consisting of just one machine.

In addition, it is obvious that an object of the present invention can be realized by supplying a storage medium, in which software code that can execute the above described functions is stored, to a system or a device to make the system or equipment computer (or CPU or MPU) read in the stored program and then execute the program.

In this case, the program code read out from the storage medium realizes the functions of the embodiments of the present invention described above, and therefore the storage medium itself constitutes the present invention.

Storage media such as floppy disks, hard disks, optical disks, magneto-optical disks, CD-ROMs, CD-Rs, magnetic tapes, non-volatile memory cards, ROMs, etc. may be used to supply the program code.

Also, it is obvious that it constitutes the present invention that in addition to that a computer executes the read-out program code to realize the functions of the embodiments of the present invention described above, operating system (OS), etc., which runs in the computer, performs either a portion of or the entire of the processing to realize the functions in the embodiments described above.

In addition, after the program code has been read out from the storage medium and written to a memory in an expansion board inserted into the computer or expansion unit connected to the computer, the CPU etc. arranged on the expansion board or in the expansion unit may perform either a portion of or the entire amount of the processing to realize the functions in the embodiments described above. This also constitutes the present invention.

The foregoing description of embodiments has been given for illustrative purposes only, and is not to be construed as imposing any limitations in any respect. The scope of the invention is, therefore, to be determined solely by the following claims and their legal equivalents, and is not limited by the text of the specifications. Alterations made within a scope equivalent to the scope of the claims fall within the true spirit and scope of the invention.

What is claimed is:

1. An image processing apparatus comprising:
   a) an inputting unit, arranged to input encoded image data;
   b) a decoding unit, arranged to decode the encoded image data;
   c) a controller, arranged to control the decoding process of said decoding unit according to the processing capabilities of said decoding unit,
   wherein the encoded image data includes image data of a plurality of objects, encoded on an object basis and said plurality of objects include an image of a hierarchically-encoded object;
   d) buffer memory means, arranged to buffer image data; and
   e) detection means, arranged to detect a capacity of said buffer memory means,
   wherein said controller controls which hierarchy layer of the image data of the hierarchically-encoded object is to be decoded, in accordance with a detection result of said detection means.

2. An apparatus according to claim 1, wherein said controller determines whether or not the decoding process of the encoded image data exceeds the processing capabilities of said decoding unit, and when determined that the decoding process exceeds the processing capabilities, said controller controls said decoding unit to decode only a portion of the layers of the encoded image data.

3. An apparatus according to claim 1, further comprising an instructing unit, arranged to instruct a layer that is to be decoded by said decoding unit, wherein said controller controls the decoding process of said decoding unit in accordance with an output of said instructing unit.

4. An image processing method comprising the steps of:
   inputting encoded image data;
   decoding the encoded image data;
   controlling the decoding process of said decoding step according to the encoded image data and decoding processing capabilities of said decoding step,
   wherein the encoded image data includes image data of a plurality of objects encoded on an object basis and said plurality of objects include an image of a hierarchically-encoded object;
   buffering image data with buffer memory means; and
   detecting a capacity of said buffer memory means,
   wherein said controlling step controls which hierarchy layer of the image data of the hierarchically-encoded object is to be decoded in accordance with a detection result in said detecting step.

5. A storage medium storing a program for executing a decoding process, the process comprising the steps of:
   inputting encoded image data;
   decoding the encoded image data;
   controlling the decoding process of said decoding step according to the encoded image data and decoding processing capabilities of said decoding step,
   wherein the encoded image data includes image data of a plurality of objects, encoded on an object basis and said plurality of objects include an image of a hierarchically-encoded object;
   buffering image data with buffer memory means; and
   detecting a capacity of said buffer memory means,
   wherein said controlling step controls which hierarchy layer of the image data of the hierarchically-encoded object is to be decoded in accordance with a detection result in said detecting step.

* * * * *

UNITED STATES PATENT AND TRADEMARK OFFICE
CERTIFICATE OF CORRECTION

PATENT NO. : 6,980,667 B2
DATED : December 27, 2005
INVENTOR(S) : Akiyoshi Hamanaka It is certified that error appears in the above-identified patent and that said Letters Patent is hereby corrected as shown below:

Drawings,
Sheet 22, Fig. 22, "LAYED" should read -- LAYER --.

Column 1,
Line 14, "related" should read -- relates --.

Column 7,
Line 14, "Therefore" should read -- Therefore, --.
Line 55, "data-received" should read -- data received --.

Column 8,
Line 3, "blocks" should read -- block --.
Line 18, "and" should be deleted.
Line 57, "the" should be deleted.

Column 9,
Line 20, "Therefore" should read -- Therefore, --.

Column 11,
Line 30, "the" (first occurrence) should be deleted.

Column 13,
Line 42, "The each" should read -- Each --.

Column 15,
Line 39, "the" should be deleted.

Column 16,
Line 55, "the" (second occurrence) should be deleted.

Column 17,
Line 1, "Therefore" should read -- Therefore, --.

UNITED STATES PATENT AND TRADEMARK OFFICE
CERTIFICATE OF CORRECTION

PATENT NO. : 6,980,667 B2
DATED : December 27, 2005
INVENTOR(S) : Akiyoshi Hamanaka It is certified that error appears in the above-identified patent and that said Letters Patent is hereby corrected as shown below:

<u>Column 18,</u>
Line 1, "Therefore" should read -- Therefore, --.
Line 17, "from" should be deleted.
Line 18, "possibility" should read -- a possibility --.
Line 49, "above described" should read -- above-described --.

Signed and Sealed this

Thirteenth Day of June, 2006

JON W. DUDAS
*Director of the United States Patent and Trademark Office*